US012057801B1

(12) United States Patent
Jasmin et al.

(10) Patent No.: US 12,057,801 B1
(45) Date of Patent: Aug. 6, 2024

(54) DEVICES AND SYSTEMS FOR MOUNTING SOLAR PANELS TO METAL ROOFS

(71) Applicant: Sunmodo Corporation, Vancouver, WA (US)

(72) Inventors: Roland Jasmin, Portland, OR (US); Matthew Danning, Oakland, CA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/400,886

(22) Filed: Dec. 29, 2023

(51) Int. Cl.
| | | |
|---|---|---|
| *H02S 20/23* | (2014.01) | |
| *F16B 2/10* | (2006.01) | |
| *F16B 5/06* | (2006.01) | |
| *F24S 25/636* | (2018.01) | |
| *E04D 3/361* | (2006.01) | |

(52) U.S. Cl.
CPC ............... *H02S 20/23* (2014.12); *F16B 2/10* (2013.01); *F16B 5/0685* (2013.01); *F24S 25/636* (2018.05); *E04D 2003/3615* (2013.01)

(58) Field of Classification Search
CPC .... F16B 5/0685; F16B 5/0064; F16B 5/0072; F16B 2/10; F24S 25/636; H02S 20/23; E04D 2003/3615
See application file for complete search history.

(56) References Cited

U.S. PATENT DOCUMENTS

| | | |
|---|---|---|
| 5,176,462 A | 1/1993 | Chen |
| 5,222,340 A | 6/1993 | Bellem |
| 5,613,328 A | 3/1997 | Alley |
| 6,318,028 B2 | 11/2001 | Alley |
| 6,588,713 B2 | 7/2003 | Kilkenny |
| 7,703,256 B2 | 4/2010 | Haddock |
| 8,505,864 B1 | 8/2013 | Taylor et al. |
| 9,076,899 B2 | 7/2015 | Schrock |
| 9,086,185 B2 | 7/2015 | Haddock |
| 9,097,443 B2 | 8/2015 | Liu et al. |
| 9,291,370 B2 | 3/2016 | Zeilenga et al. |
| 9,528,725 B2 | 12/2016 | McPheeters |
| 9,647,433 B2 | 5/2017 | Meine et al. |
| 9,893,677 B1 | 2/2018 | Liu |
| 10,270,385 B2 | 4/2019 | Xie |
| 10,487,511 B2 | 11/2019 | Lallier |

(Continued)

FOREIGN PATENT DOCUMENTS

| | | |
|---|---|---|
| CN | 101789724 A | 7/2010 |
| CN | 202049989 U | 11/2011 |

(Continued)

OTHER PUBLICATIONS

S:Flex Assembly Instructions: Clamp for Standing Seams, Jul. 2021, S:Flex Inc., Lone Tree, Colorado.

(Continued)

*Primary Examiner* — Adriana Figueroa
(74) *Attorney, Agent, or Firm* — Stone Creek Services LLC; Alan M Flum

(57) ABSTRACT

Disclosed are standing seam clamps and solar panel racking systems that include the standing seam clamps. The standing seam clamps may include detents in the sides of their clamp bodies that allow a solar panel clamp to secure to the clamp body without threaded fasteners. The standing seam clamp includes structure to secure solar panel racking system without rails. The standing seam clamp may be optionally structured to secure both rail-less and rail-base solar panel racking systems.

17 Claims, 20 Drawing Sheets

(56) References Cited

U.S. PATENT DOCUMENTS

| | | |
|---|---|---|
| 10,749,459 B1 | 8/2020 | Liu et al. |
| 10,819,271 B2 | 10/2020 | Schuit et al. |
| 11,035,126 B2 | 6/2021 | Haddock et al. |
| 11,041,314 B2 | 6/2021 | Kovacs |
| 11,196,187 B2 | 12/2021 | Ash et al. |
| 11,290,053 B2 | 3/2022 | Harris et al. |
| 11,296,648 B1 | 4/2022 | Jasmin et al. |
| 11,352,793 B2 | 6/2022 | Haddock et al. |
| 11,552,591 B2 | 1/2023 | Jasmin et al. |
| 2010/0058701 A1 | 3/2010 | Yao et al. |
| 2013/0011187 A1 | 1/2013 | Schuit et al. |
| 2014/0217253 A1 | 8/2014 | Zeilenga et al. |
| 2019/0036474 A1 | 1/2019 | Schuit et al. |
| 2022/0224280 A1 | 7/2022 | Wiggins et al. |
| 2023/0151834 A1 | 5/2023 | Kovacs |

FOREIGN PATENT DOCUMENTS

| | | |
|---|---|---|
| CN | 102709355 A | 10/2012 |
| CN | 103122679 A | 5/2013 |
| CN | 203547041 U | 4/2014 |
| CN | 203840263 U | 9/2014 |
| CN | 204392150 U | 6/2015 |
| CN | 106253807 A | 12/2016 |
| CN | 206575356 U | 10/2017 |
| CN | 208310013 U | 1/2019 |
| CN | 208310027 U | 1/2019 |
| CN | 208768013 U | 4/2019 |
| CN | 210246662 U | 4/2020 |
| CN | 210246667 U | 4/2020 |
| CN | 210351058 U | 4/2020 |
| CN | 210444209 U | 5/2020 |
| CN | 112019135 A | 12/2020 |
| CN | 212358876 U | 1/2021 |
| CN | 212478291 U | 2/2021 |
| CN | 216196064 U | 4/2022 |
| CN | 216883665 U | 7/2022 |
| CN | 217079412 U | 7/2022 |
| CN | 217204933 U | 8/2022 |
| CN | 217711436 U | 11/2022 |
| EP | 3364124 A1 | 8/2018 |
| GB | 2476104 A | 6/2011 |
| JP | 2011140861 A | 7/2011 |
| KR | 101231150 B1 | 2/2013 |
| KR | 102204867 B1 | 1/2021 |

OTHER PUBLICATIONS

S:Flex Mounting Systems for Standing Seam Sheet Metal Roofing for Framed Modules, Mar. 2019, S:Flex Inc., Lone Tree, Colorado.

S:Flex System Solutions, Apr. 2022, S:Flex Inc., Lone Tree, Colorado.

S:Flex Technical Data: Mounting Systems for Trapezoidal and Corrugated Sheet Roofs, Jan. 2019, S:Flex Inc., Lone Tree, Colorado.

Magerack Metal Roof Catalog, Apr. 2023, Magerack Corporation, Riverside, California.

MageBracket RH and RL Mounting Kits for R-Panel Trapezoidal Metal Roof, Mar. 2023, Magerack Corporation, Riverside, California.

Sunmodo SMR System Datasheet, Version D1022-V001, Sep. 2020, Sunmodo Corporation, Vancouver, Washington.

Eco Fasten Rib Fit Brochure, Version 1.5, Apr. 2023, Eco Fasten Solar LLC, Phoenix, Arizona.

Eco Simple Block Brochure, Version 1.5, Apr. 2023, Eco Fasten Solar LLC, Phoenix, Arizona.

Eco Click Fit Brochure, Version 2.1, Apr. 2023, Eco Fasten Solar LLC, Phoenix, Arizona.

Ace Clamp Rackless Solar PV Kit, Mar. 2023, PMC Industries Inc., Plainville, Connecticut.

MG Solar Metal Roof Mount System, May 2019, MG Solar, Xiamen City, China.

S-5! The Right Way PVKit 2.0 MidGrab or Edge Grab, Aug. 2021, Metal Roof Innovations, Ltd, Iowa Park, Texas.

SnapNrack Solar Mounting Solutions Ultra Rail Residential Roof Mount System Installation Manual, Apr. 2021, SnapNRack Inc. (A division of SunRun Inc), San Luis Obispo, California.

IronRidge QuickMount Lnyx, Version 1.14, Apr. 2023, IronRidge Inc. (A division of Esdec B.V.), Hayward, California.

Power Clamp for Standing Seam Clamps, Nov. 2018, Solar Connections International, McHenry, Illinois.

Pvsolver Technical Data Sheets, Jul. 2018, Pvsolver Photovoltaic Engineering Co., Ltd, Jiangynin City, China, downloaded from the Internet from https://www.pvsolver.com/_files/ugd/7924ef_882ed7cdea69483dbff52314822a629c.pdf on Jun. 26, 2022.

DEVICES AND SYSTEMS FOR MOUNTING SOLAR PANELS TO METAL ROOFS

BACKGROUND

This application relates to devices and systems for attaching solar panels to standing seam metal roofs.

Solar panel racking systems secure solar panels to roof structures, such as standing seam metal roofs. A standing steam metal roof typically includes metal panels with vertical legs. The vertical legs keep the standing seam metal roof panels firmly attached to each other. Once secured, the vertical legs form a watertight seam known as a "standing seam." Standing seams come in a variety of shapes, or "profiles," reflecting different seam joint and roof attachment strategies. Examples of standing seam profiles include "overlap," "single lock," "double lock," "tee," and "snap lock."

A solar panel racking system for standing seam metal roofs may include standing seam clamps. These standing seam clamps secure the racking system and solar panel to the metal roof by clamping to the standing seam.

Solar panel racking systems are often rail-based or rail-less. Rail-based solar panel racking systems use rails to support the solar panel above the roof surface. These rails may span lengthwise or widthwise across one or more solar panels. A rail-less system, as its name implies, does not use rails to secure the solar panels. Instead, it uses devices that attach the solar panels directly to the roof surface.

National, regional, and local building codes regulate solar panel system installation and dictate system grounding to prevent electrical shock and fires.

SUMMARY

The inventors observed that standing seam clamps typically only work with a small number standing seam profiles. The inventors also noted that there are standing seam clamps that work with either rail-based or rail-less systems, but typically not both. In addition, while there exist adjustable standing seam clamps that may work with a wider range of standing seam profiles, they may not have ideal system grounding.

In response to these observations, the inventors developed a standing seam clamp that can work with both rail and rail-based systems, can accommodate a wider range of standing seam profiles, and has better optimized grounding.

To accommodate a wider range of standing seam profiles, the device may include a standing seam clamp with a clamp body and a pivot arm. The clamp body and pivot arm may form the outside surfaces of the standing seam clamp. The pivot arm may be pivotably attached to the clamp body. For example, the pivot arm may include a hinge pin extending lengthwise along the upper pivot arm. The clamp body may include a hinge receiver extending lengthwise within the upper clamp body. The hinge receiver may be sized and shaped to pivotally receive and captively hold the hinge pin. The pivot arm may include a pivot arm end. The clamp body may likewise, include a clamp body end. The pivot arm end extends inward toward the clamp body end. The pivot arm end and clamp body end engage and clamp the standing seam. A threaded fastener may selectively pivot the pivot arm end with respect to the clamp body end. The threaded fastener passes at least partially through a slot-shaped aperture in the pivot arm and engages a threaded aperture in the clamp body. The slot-shaped aperture may extend upward through the pivot arm. The clamp body may optionally include a seam stop. The seam stop prevents the standing seam clamp from moving below a pre-determined height with respect to the standing seam. The seam stop may be located below the threaded aperture in the clamp body and above the clamp body end. To help optimize the clamping force, the center of the pivot point of the pivot arm may be located in the upper clamp body and aligned with the clamp body end in a lengthwise-heightwise plane. To further optimize clamping strength, the clamp body lower portion, located between the seam stop end and the clamp body end, can be substantially c-shaped. Likewise, a portion of the pivot arm may include a substantially c-shaped portion extending downward from the hinge pin and extending to the pivot arm end.

For rail-less systems, the clamp body may include a slot and detents. The slot may extend lengthwise along the clamp body top. The detents may be indented within upper side portions of the upper clamp body. The upper side portions may extend downward from the clamp body top. An installer can "pop on" portions of a solar panel pop-on clamp over the upper side portions and into the detents. The installer then seats the solar panel onto the clamp body top and clamps the solar panel with the solar panel pop-on clamp. Optionally, portions of the solar panel pop-on clamp can seat within the slot and include electrical bonding as described below.

For rail-based systems, the standing seam clamp may include structure that secures an L-foot. An installer can use the L-foot to secure the standing seam clamp to a rail. The installer may optionally secure the standing seam clamp to the rail using the L-foot in combination with an L-foot adapter. The installer fastens the L-foot to the standing seam clamp using a threaded fastener. The threaded fastener engages an threaded aperture in the slot within the clamp body top.

To solve the system grounding issue, the inventors developed a standing seam clamp that may include some or all the elements described above and with added structure for electrical bonding. For example, bonding pins, movable within the pivot arm end and the clamp body end, can face one another, and each engage the standing seam. These bonding pins are optionally slotted lengthwise. The lengthwise slot allows the bonding pin to compress when inserted into an aperture that is larger than its resting diameter. Once inserted in the aperture, the bonding pin re-expands. Spring tension from the re-expansion of the bonding pin holds it within the aperture. As the installer tightens the standing seam clamp against the standing seam, the bonding pin digs into the standing seam and moves within the aperture to dig into the standing seam clamp. This creates an electrical bond as the bonding pin breaks through the thin non-conductive oxide surface layer and into the conductive layer of both the standing seam clamp and the standing seam. The pressure from the bonding pin against the conductive layer creates a conductive electrical bond that is airtight and will resist deterioration over time from oxidation.

In a rail-less system, with the standing seam clamp electrically bonded to the metal roof as described above, an installer can electrically bond the solar panel to the standing seam clamp by using a pop-on clamp as described in the Detailed Description. This pop-on clamp includes a bonding block as well as bonding pins. The bonding block seats within the slot in the clamp body top. One or more solar panels seat against the clamp body top. The bonding pins dig into the solar panel frame and standing seam clamp to create an electrical bond.

In rail-based system, bonding pins may dig into the solar panel and the rail to electrically bond them together. These bonding pins are seated in bonding blocks attached to the pop-on clamp. An L-foot adapter can include clamping portions that dig into the rail and create an electrical bond with the rail. A threaded fastener with sharp components, such as a star washer, or sharp under flange, can dig into the L-foot to create electrical bonding between the rail and the L-foot. A threaded fastener with sharp components may electrically bond the L-foot to the threaded aperture within the clamp body top. The clamp body is bonded to the roof as described in the previous paragraphs.

This Summary discusses various examples and concepts. These do not limit the inventive concept. Other features and advantages can be understood from the Detailed Description, figures, and claims.

DETAILED DESCRIPTION

This Detailed Description includes the following sections: Definitions, Overview, General Discussion, and Conclusion and Variations.

Definitions

This Detailed Description and the claims may use ordinal numbers, such as "first," "second," or "third," to tell the difference between similarly named parts. These do not suggest order, preference, or importance. Throughout this disclosure, the words "comprise," "comprising," "include," "including," "have," "having," "with," "contain," or "containing" are inclusive, or open-ended, and do not exclude unrecited elements. This disclosure uses "optional" to describe features or structures that are optional. Omitting "optional" does not imply features or structures are not optional. In this disclosure, "or" is inclusive, unless preceded by "either," which makes it exclusive.

Sub-circular: As defined in this disclosure, sub-circular refers to a shape representing a portion of a circle that is greater than a semi-circle and less than a full circle.

Sub-cylinder: As defined in this disclosure, a sub-cylinder is a body with parallel sides and with a sub-circular cross section.

Lengthwise, widthwise, and heightwise: As defined in this disclosure, "lengthwise" means the direction from front to back of an object. "Widthwise" means the side-to-side direction. "Heightwise" means the direction from top to bottom of the object with the bottom of the object oriented toward the surface of the roof.

Lengthwise-widthwise plane: As defined in this disclosure, a lengthwise-widthwise plane means a plane that extends along the lengthwise and widthwise direction of the object.

Lengthwise-heightwise plane: As defined in this disclosure, a lengthwise-heightwise plane means a plane that extends along the lengthwise and heightwise direction of an object Overview As discussed in the Summary, the inventors observed that standing seam clamps typically work with only a small number of standing seam profiles. The inventors also noted that there are standing seam clamps that work with rail-based or rail-less systems, but typically not both. In addition, while there are adjustable standing seam clamps that may work with a wider range of standing seam profiles, they may not have ideal system grounding.

Figure 1:
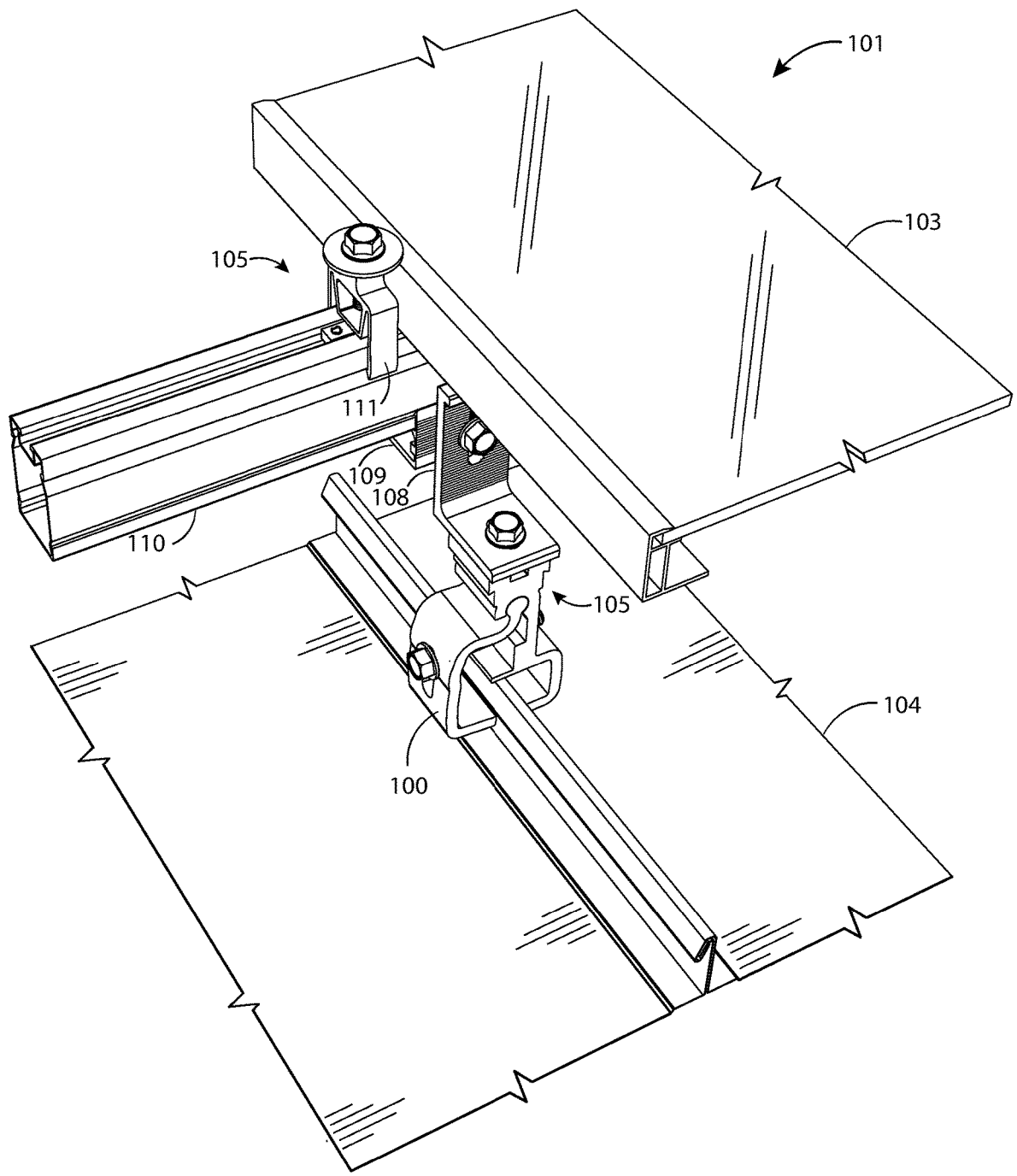
FIG. 1 illustrates, in front perspective view, part of a rail-based system for mounting solar panels to a metal roof that includes a standing seam clamp.
Figure 2:
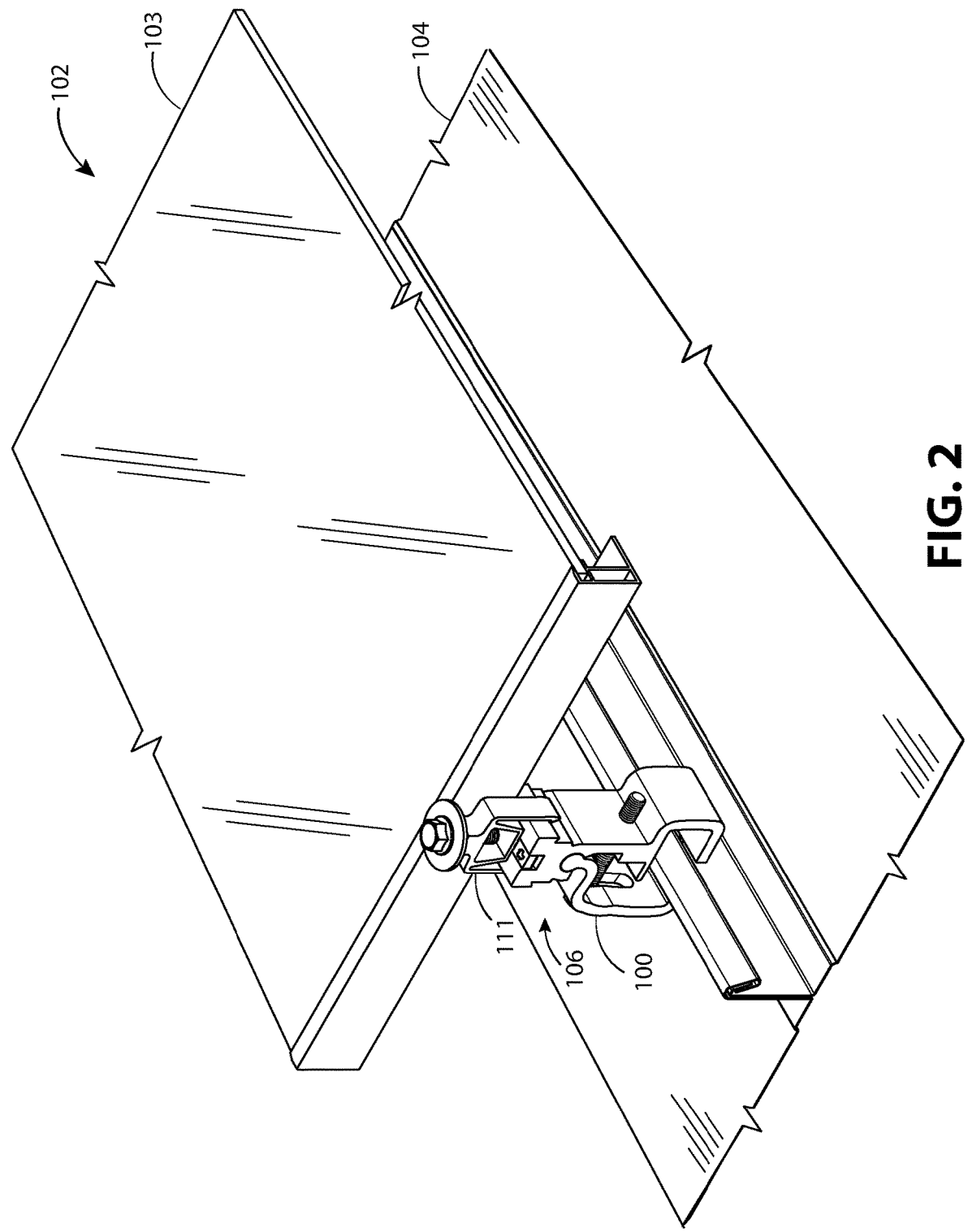
FIG. 2 illustrates part of of a rail-less system for mounting solar panels to a metal roof using the standing seam clamp of FIG. 1.
Figure 3:
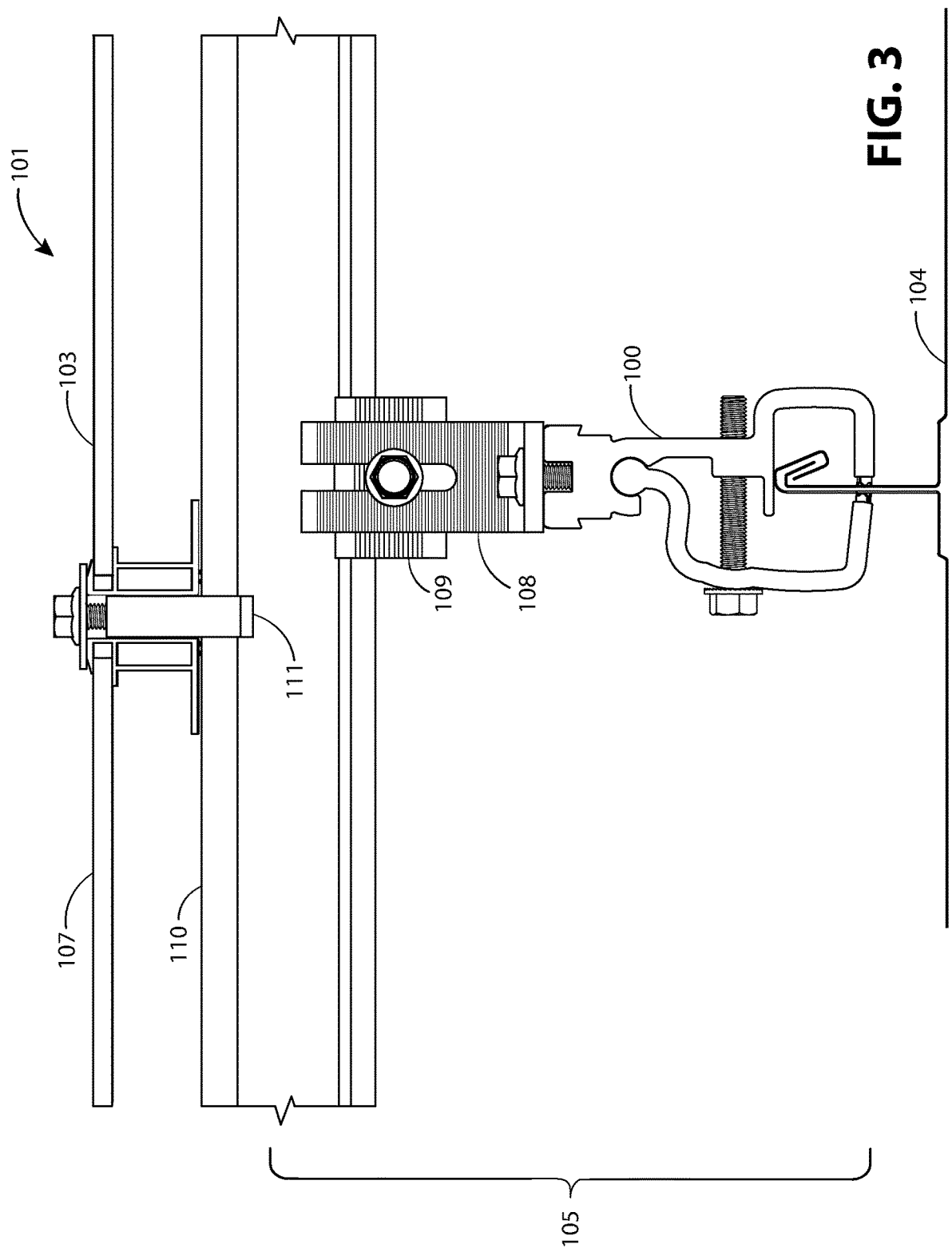
FIG. 3 shows a portion a rail-based system of FIG. 1 in front view.
Figure 4:
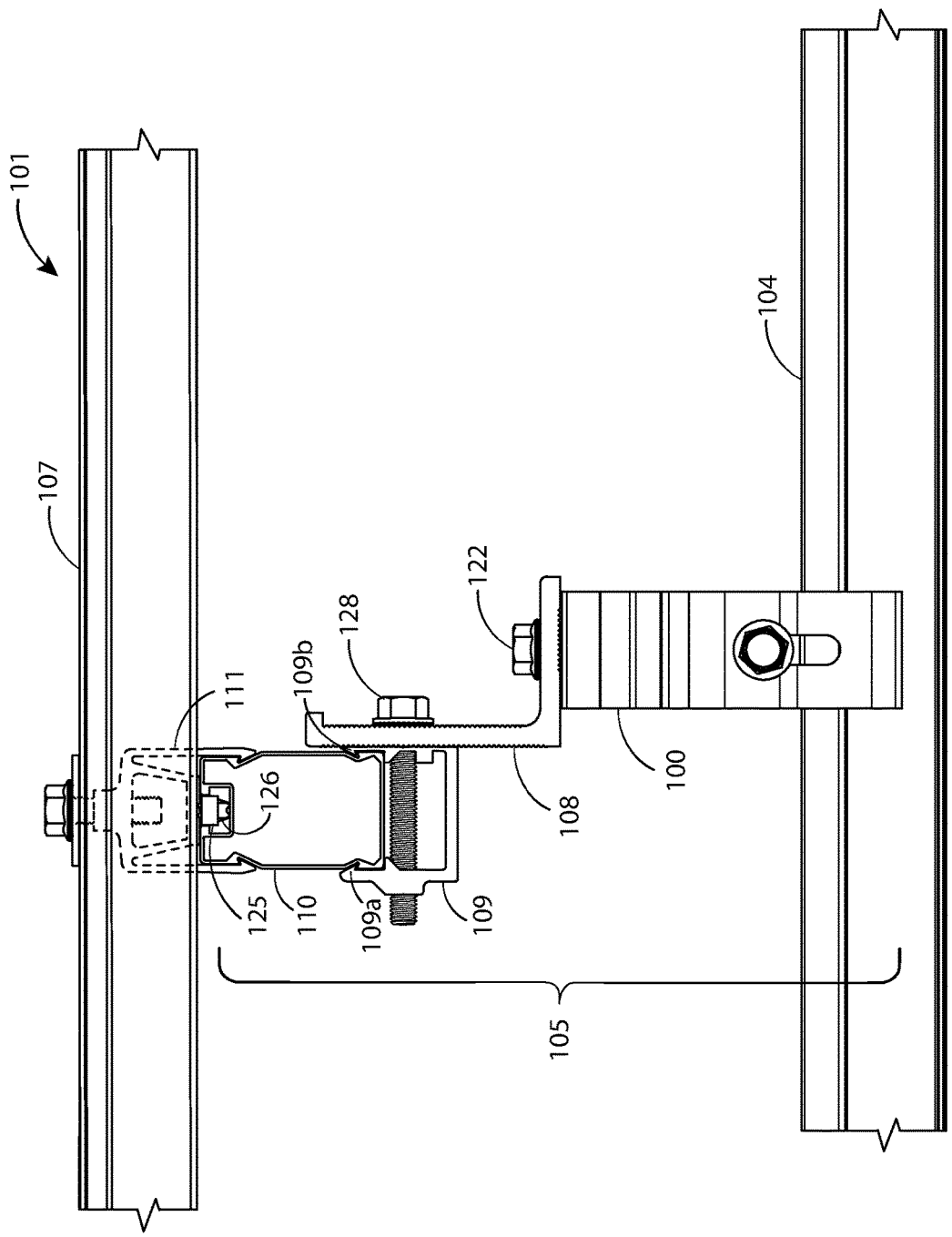
FIG. 4 shows a portion a rail-based system of FIG. 1 in side view.
Figure 5:
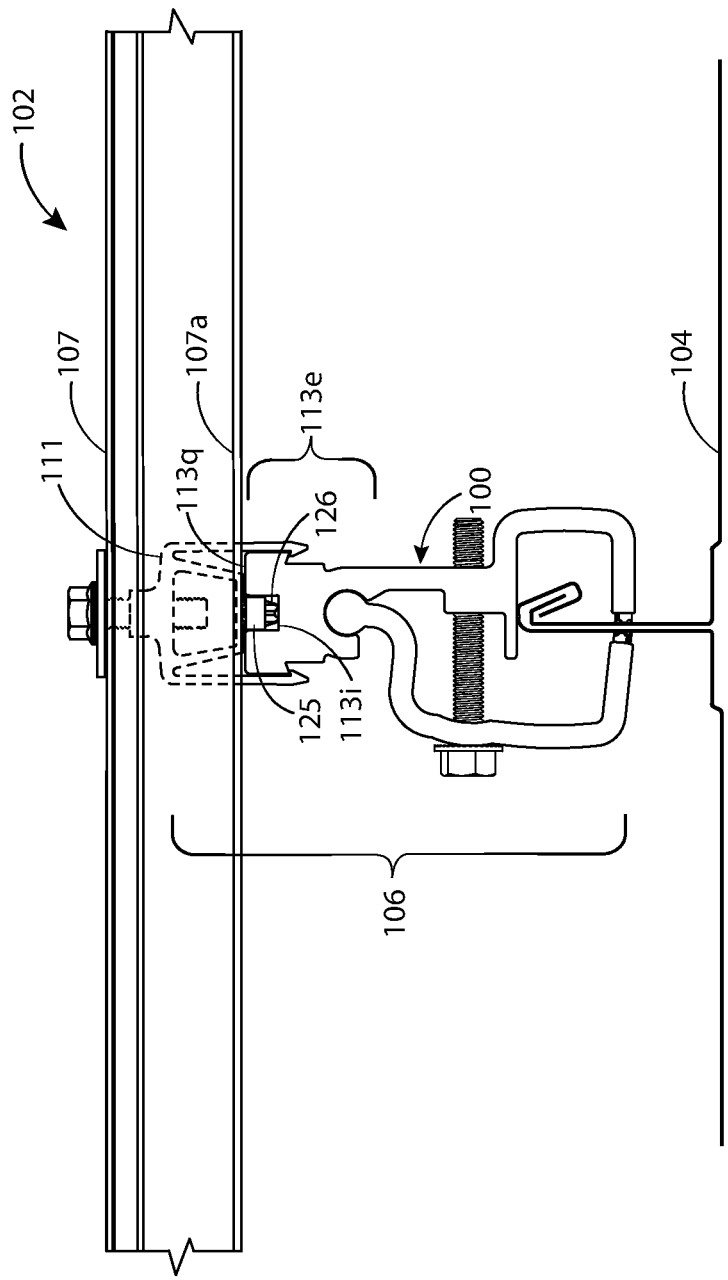
FIG. 5 shows a portion of the rail-less system of FIG. 2 in front view.
Figure 6:
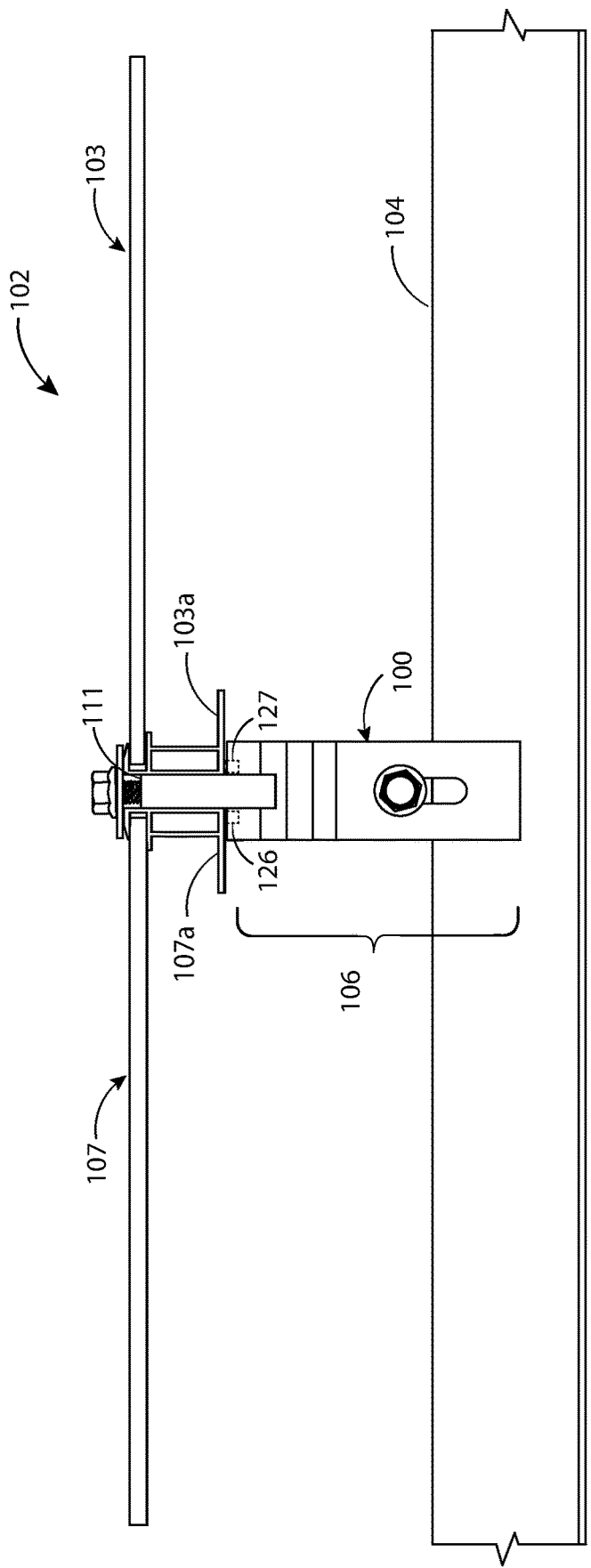
FIG. 6 shows a portion of the rail-less system of FIG. 2 in side view.

In response to these observations, the inventors developed a standing seam clamp that can work with both rail and rail-based systems, can accommodate a wider range of standing seam profiles, and has better optimized system grounding. This disclosure will discuss examples of this standing seam clamp. FIGS. 1 and 2 illustrate the solar panel system 101 and solar panel system 102, respectively, using a standing seam clamp 100 to secure solar panel 103 to a standing seam metal roof 104. FIGS. 1, 3, and 4 illustrate a rail-based racking system, the solar panel racking system 105. FIGS. 2, 5 and 6 illustrate a rail-less racking system, the solar panel racking system 106. Referring to FIGS. 1, 3, and 4, a standing seam clamp 100 secures the solar panel racking system 105 to the standing seam metal roof 104. Referring to FIGS. 2, 5, and 6, the standing seam clamp 100 secures the solar panel racking system 106 to the standing seam metal roof 104.

Referring to FIGS. 1, 3, and 4, the rail-based solar panel racking system, solar panel racking system 105, may include the standing seam clamp 100, an L-foot 108, an L-foot adapter 109, a rail 110, and a solar panel pop-on clamp 111. The solar panel pop-on clamp 111 secures the solar panel 103 (FIGS. 1 and 3) and the solar panel 107 (FIGS. 3 and 4) to the rail 110. An L-foot adapter 109 secures the rail 110 to the L-foot 108. The standing seam clamp 100 secures the L-foot 108 and the other components of the solar panel racking system 105 to the standing seam metal roof 104.

Referring to FIGS. 2, 5, and 6, the rail-less solar panel racking system, solar panel racking system 106, may also include the solar panel pop-on clamp 111 and the standing seam clamp 100. The solar panel pop-on clamp 111 secures the solar panel 103 (FIGS. 2 and 6) and solar panel 107 (FIGS. 4 and 6) to standing seam clamp 100. The standing seam clamp 100 secures the solar panel pop-on clamp 111 and solar panels to the roof.

Note that in FIGS. 1 and 2, the solar panel 107 is removed from the figures to view otherwise hidden features. In FIGS. 4 and 5 the solar panel 103 is hidden from view behind solar panel 107.

One advantage of both the rail-based and rail-less systems, as illustrated, in FIGS. 1-6 is that they can share some common parts, decrease the number of fasteners by using snap into place connections, and use common fastener heads, all to simplify installation and logistics. For example, solar panel racking system 105 of FIGS. 1, 3, and 4 and solar panel racking system 106 of FIGS. 2, 5, and 6 can use the solar panel pop-on clamp 111 and the standing seam clamp 100. In FIGS. 2, 5, and 6, the solar panel pop-on clamp 111 snaps or pops directly onto the upper side portions of the standing seam clamp 100. In FIGS. 1, 3, and 4, the solar panel pop-on clamp 111 snaps or pops onto the sides of the rail 110. The bottom sides of the rail 110 snaps onto the L-foot adapter 109. The solar panel pop-on clamp 111, L-foot adapter 109, and L-foot 108 can all share a common fastener head type and size, for example, an 8 mm hex head, so the installer can use the same tool or tool bit throughout the installation process.

General Discussion

Figure 7:
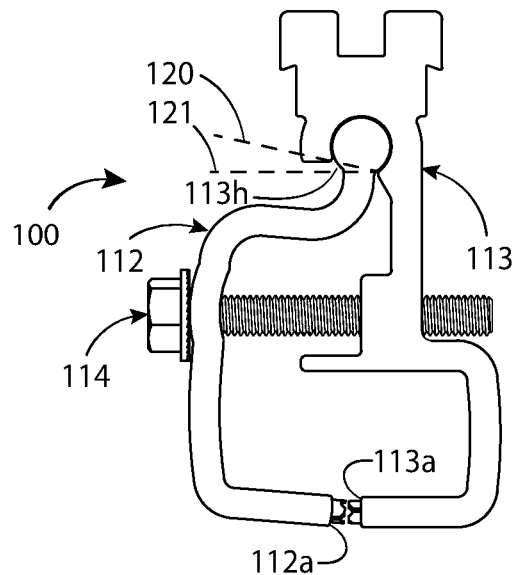
FIGS. 7-12 show, in various views, the standing seam clamp with the pivot arm in two different positions relative to the clamp body.
Figure 8:
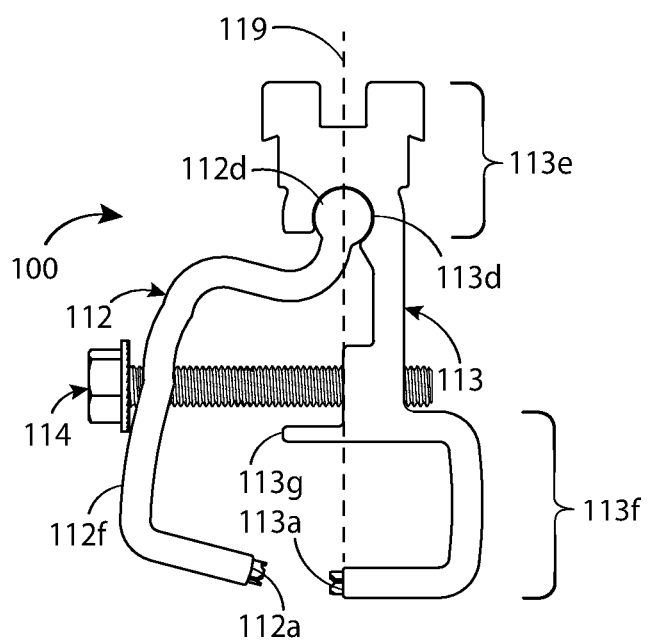
Figure 9:
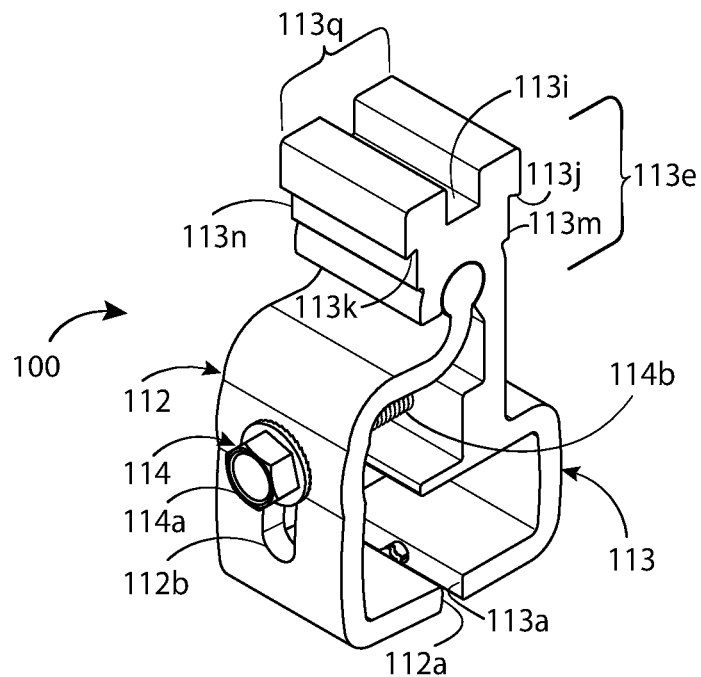
Figure 10:
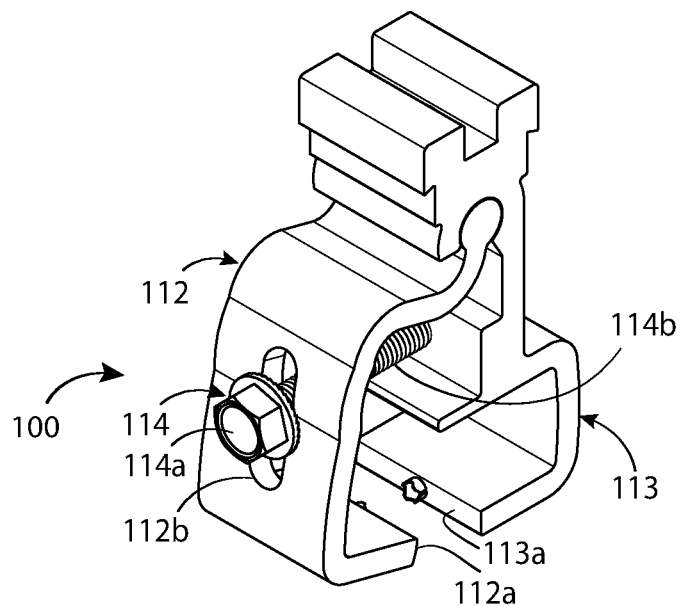
Figure 11:
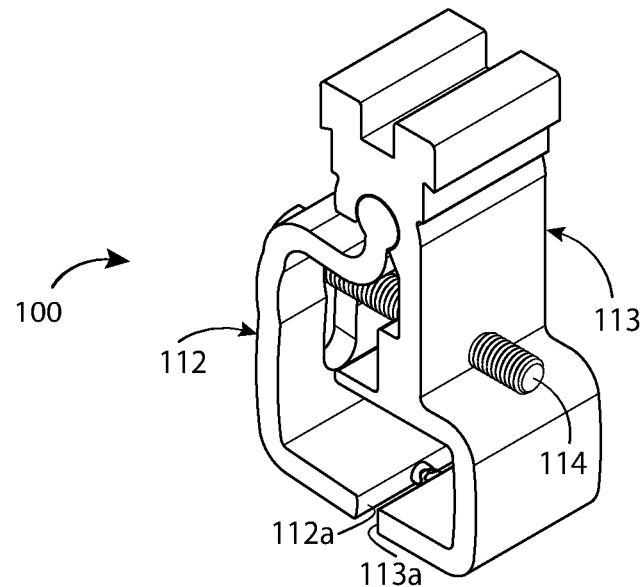
Figure 12:
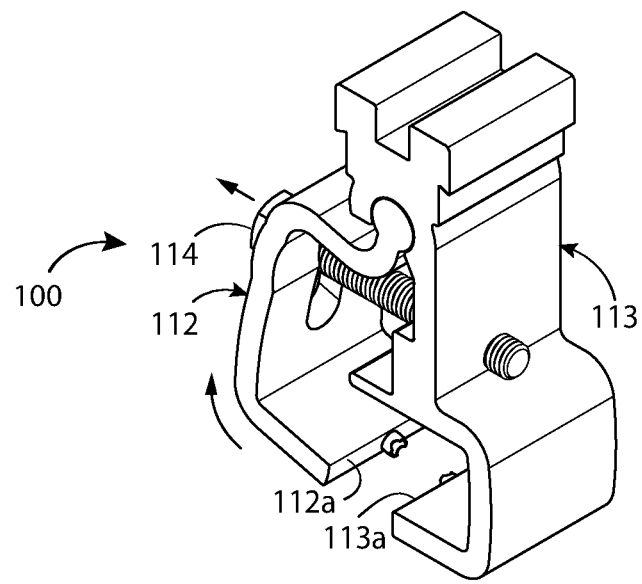
Figure 13:
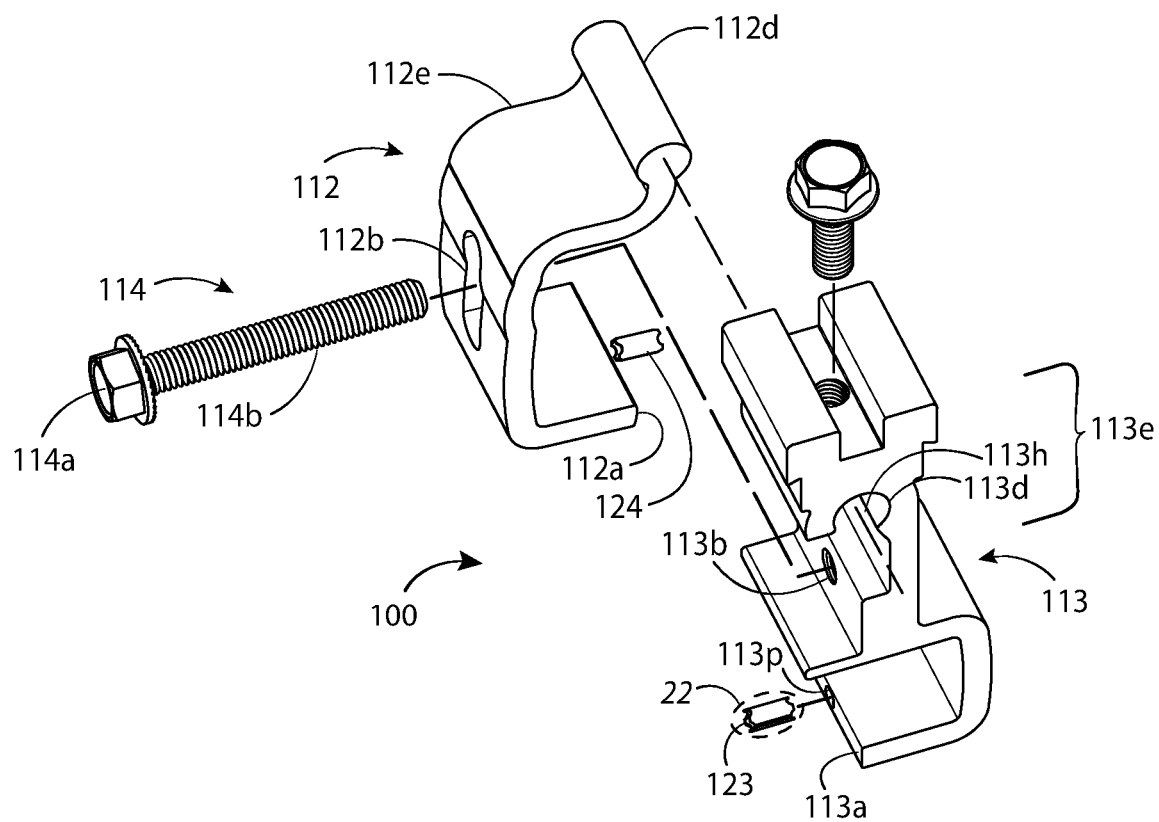
FIGS. 13 and 14 illustrate the standing seam clamp in exploded isometric view.
Figure 14:
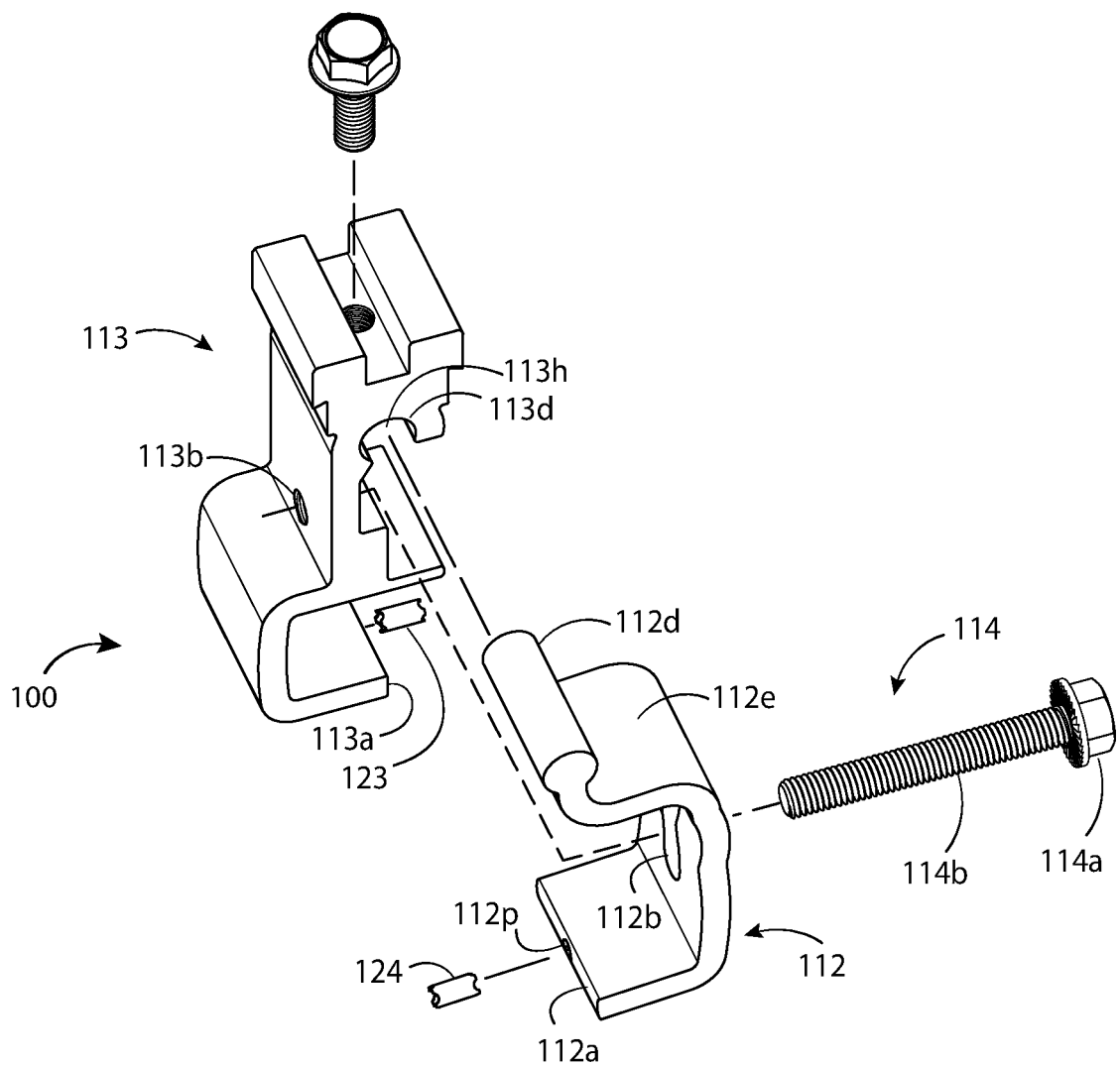

To accommodate a wider range of standing seam profiles, the standing seam clamp 100 may include a pivotable arm that pivotally attaches to a stationary clamp body. FIGS. 7-12 show, in various views, the standing seam clamp 100 that includes a pivot arm 112 pivotably attached to clamp body 113. As illustrated, the clamp body 113 and pivot arm 112 form the outside surfaces of the standing seam clamp 100. A threaded fastener 114 may selectively pivot the pivot arm end 112a with respect to the clamp body end 113a. The clamp body end 113a extends inward from the clamp body toward the pivot arm 112. Referring to FIGS. 9 and 10, the threaded fastener 114 includes a fastener body 114b and a fastener head 114a. The fastener body 114b at least partially passes through a slot-shaped aperture 112b and engages a threaded aperture in the clamp body 113. The slot-shaped aperture 112b may extend upward along the pivot arm 112, as shown. FIGS. 13 and 14 illustrate the threaded aperture 113b in the clamp body 113, the slot-shaped aperture 112b in the pivot arm 112, and the fastener body 114b and the fastener head 114a of the threaded fastener 114. As shown in FIGS. 8, 10, and 12, loosening the threaded fastener 114 allows the pivot arm end 112a to pivot away from the clamp body end 113a. As shown in FIGS. 7, 9, and 11, tightening the threaded fastener 114 pivots the pivot arm end 112a to pivot toward the clamp body end 113a. Referring to FIGS. 13 and 14, slot-shaped aperture 112b keeps the threaded fastener 114 from binding, as the pivot arm 112 moves. As shown in FIGS. 9 and 10, tightening the threaded fastener 114 moves it upward along the slot-shaped aperture 112b while loosening the threaded fastener 114 moves it down along the slot-shaped aperture 112b.

Figure 15:
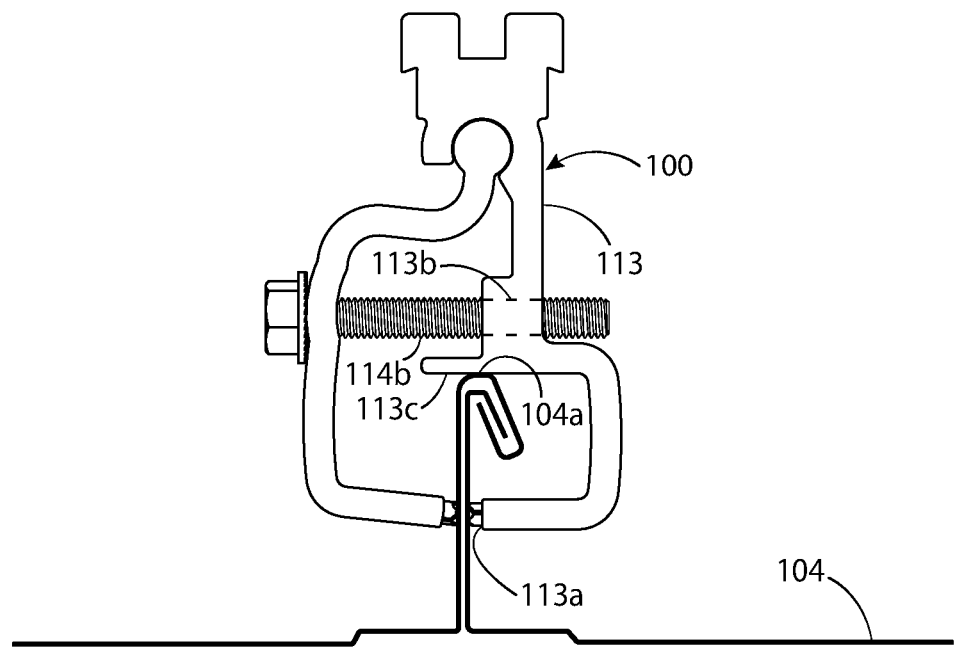
FIGS. 15-18 illustrate the standing seam clamp attached to various types of standing seam roof panel profiles.
Figure 16:
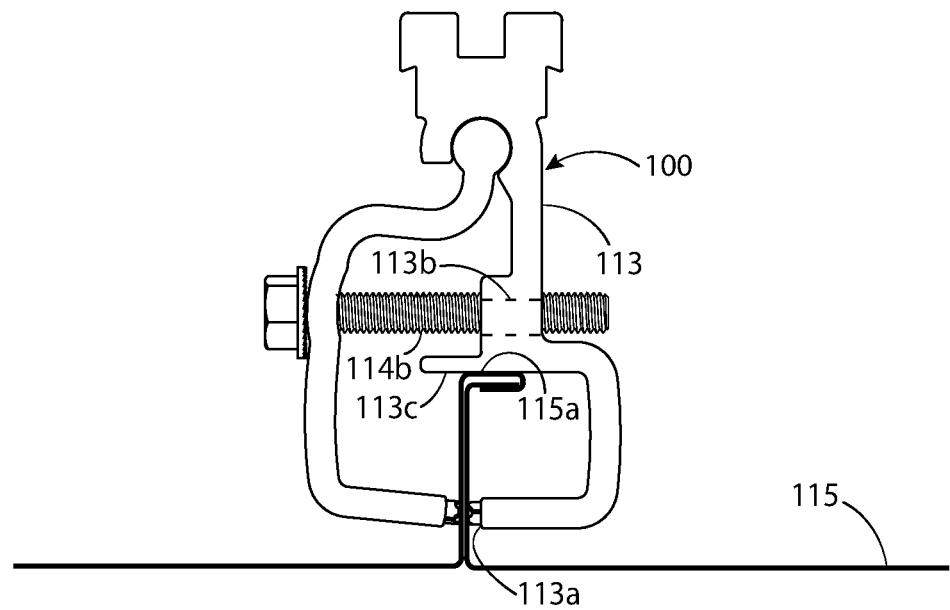
Figure 17:
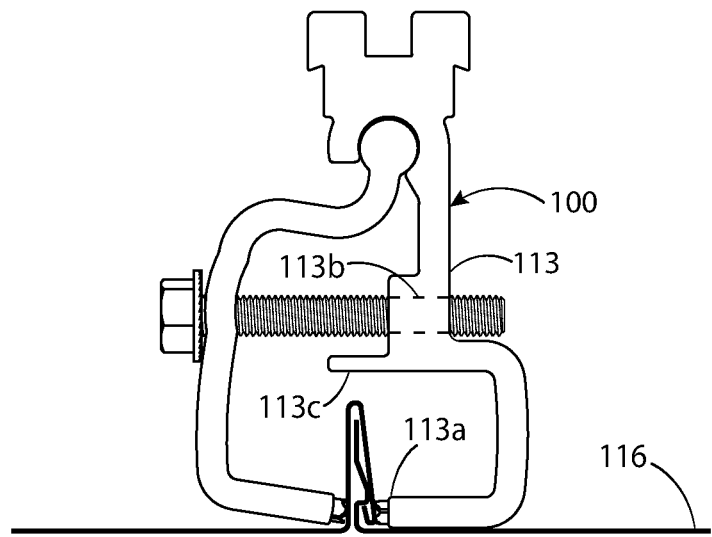
Figure 18:
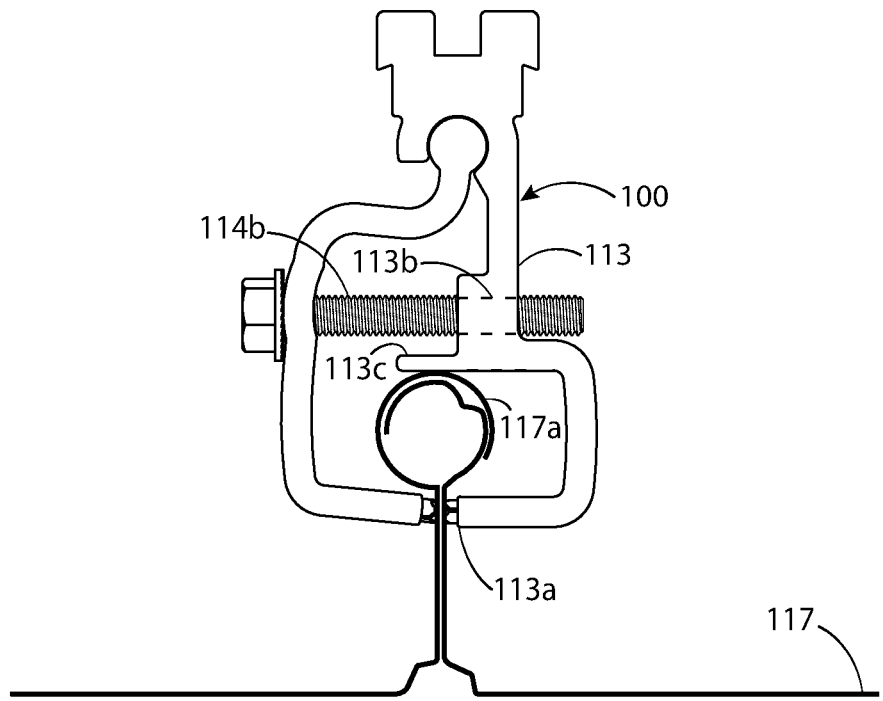

FIGS. 15-18 show examples of the standing seam clamp 100 attached to various standing seam roof profiles. FIG. 15 shows the standing seam clamp 100 attached to standing seam metal roof 104, with a double fold or double lock standing seam. FIG. 16 shows the standing seam clamp 100 attached to a standing seam metal roof 115, with a single fold or single lock standing seam profile. FIG. 17 shows the standing seam clamp 100 attached to a standing seam metal roof 116, with a snap lock standing seam profile. FIG. 18 shows the standing seam clamp 100 attached to a standing seam metal roof 117, with a bulb style or bulb-shaped standing seam profile. Referring to FIGS. 15-18, the clamp body 113 of the standing seam clamp 100 may optionally include a seam stop 113c. Seam stop 113c keeps the standing seam clamp from moving below a pre-determined height with respect to the standing seam. The seam stop 113c may be located below the threaded aperture 113b in the clamp body 113, and above the clamp body end 113a. FIGS. 15, 16, and 18 illustrate examples of how the seam stop 113c acts as guide or stop for seating the standing seam clamp 100 with respect to the standing seam. In FIG. 15, the seam stop 113c rests or seats against the standing seam top 104a. In FIG. 16, the seam stop 113c seats against the standing seam top 115a. In FIG. 18, the seam stop 113c seats against the standing seam 117a. As shown in FIGS. 15, 16, and 18, locating the seam stop 113c below the threaded aperture 113b, protects the standing seam from the fastener body 114b.

A challenge faced by the inventors was to develop a standing seam clamp for a wide range of standing seam profiles without sacrificing the standing seam clamp's clamping performance. How much the solar panel system resists pulling up from the roof from high winds, depends, in part, from the standing seam clamp's ability to stay clamped to the standing seam. Referring to FIG. 8, the inventors further optimized the standing seam clamp to increase clamping pressure on the standing seam. They did so by locating the center of the pivot point of the pivot arm 112 in the upper clamp body 113e and aligning the center of the pivot point with the clamp body end 113a in a lengthwise-heightwise plane 119. To further optimize clamping strength, the clamp body lower portion 113f, between the seam stop end 113g and the clamp body end 113a, can be substantially c-shaped. Likewise, the pivot arm 112 may include a substantially c-shaped portion 112f extending downward from the hinge pin 112d and extending to the pivot arm end 112a. The substantially c-shaped portion 112f in combination with the threaded fastener 114 provides a greater moment arm and therefore more applied force on pivot arm end 112a. In addition, the combination of the substantially c-shaped portion of the clamp body lower portion 113f and the substantially c-shaped portion 112f allow the standing seam clamp 100 to accept a wider range of standing seam profiles.

One of the challenges with the above described pivoting structure, was where and how to locate the pivot point with respect to the clamp arm end and still allow pivoting. Referring to FIGS. 13 and 14, one approach developed by the inventors was to shape the upper pivot arm, hinge pin, and hinge receiver opening to optimize pivoting. The hinge pin 112d and hinge receiver 113d are sub-cylindrically shaped. The upper pivot arm 112e extends downward and then curves or arcs away from the clamp body 113. As shown in FIG. 7, the slot-shaped opening 113h at the bottom of the hinge receiver makes an oblique angle 120 with respect with a lengthwise-widthwise plane 121. FIGS. 13 and 14, show the hinge receiver 113d sized and shaped to receive the hinge pin 112d. The sub-cylindrical shape of the hinge receiver 113d allows the hinge receiver to captively hold the hinge pin 112d. To help maximize the rotational angle of the pivot arm 112, the upper pivot arm 112e extends downward and outward from the hinge pin. In addition, the slot-shaped opening 113h extends away from the clamp body 113 at an oblique angle 120 as described above.

Figure 19:
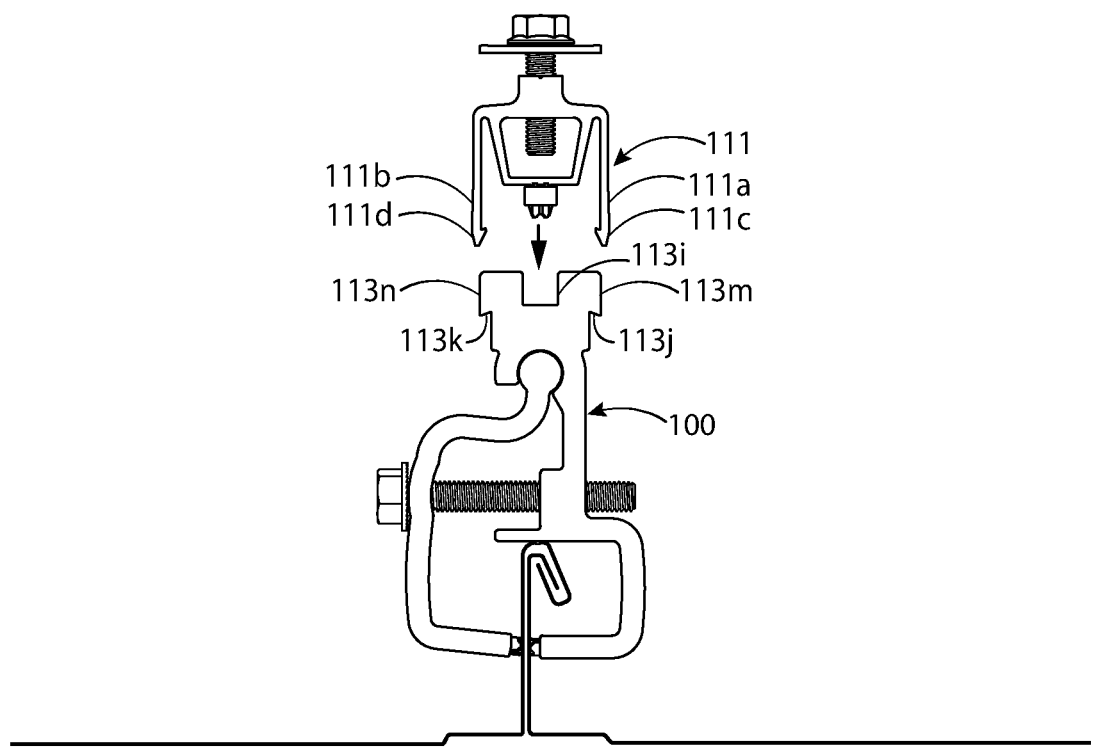
FIGS. 19 and 20 illustrate attaching the pop-on solar panel clamp to the standing seam clamp.
Figure 20:
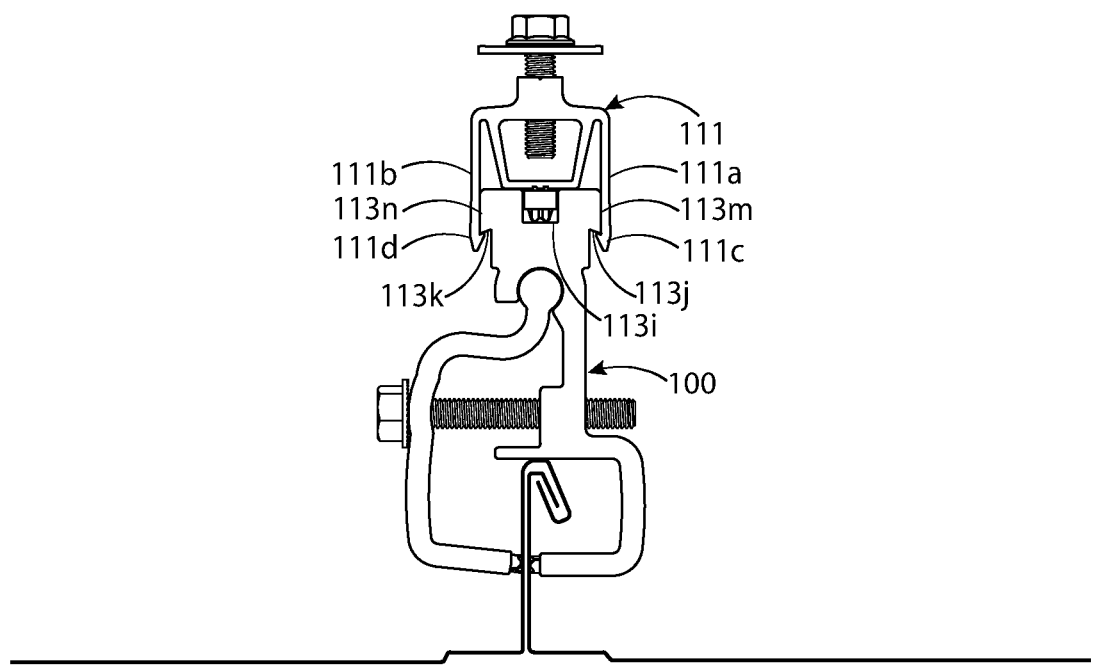

Referring to FIG. 9, to accommodate rail-less systems, the upper clamp body 113e may include a slot 113i extending lengthwise along the clamp body top 113q and may include detents 113j, 113k within upper side portions 113m, 113n, respectively, that extend downward from the upper clamp body 113e. Referring to FIGS. 19 and 20, an installer can secure the solar panel pop-on clamp 111 to the standing seam clamp 100. The installer can do so by positioning the pop-on clamp sides 111a, 111b over the upper side portions 113m, 113n, respectively, and popping on pop-on clamp clamping portions 111c, 111d into the detents 113j, 113k, respectively. The detents 113j, 113k extend downward and away from the clamp body 113 to prevent the solar panel pop-on clamp 111 from pulling upward. The detents may be positioned below the slot 113i to allow portions of the solar panel pop-on clamp 111 to be optionally seated within the slot 113i. These portions may include electrical bonding, as discussed below.

Figure 21:
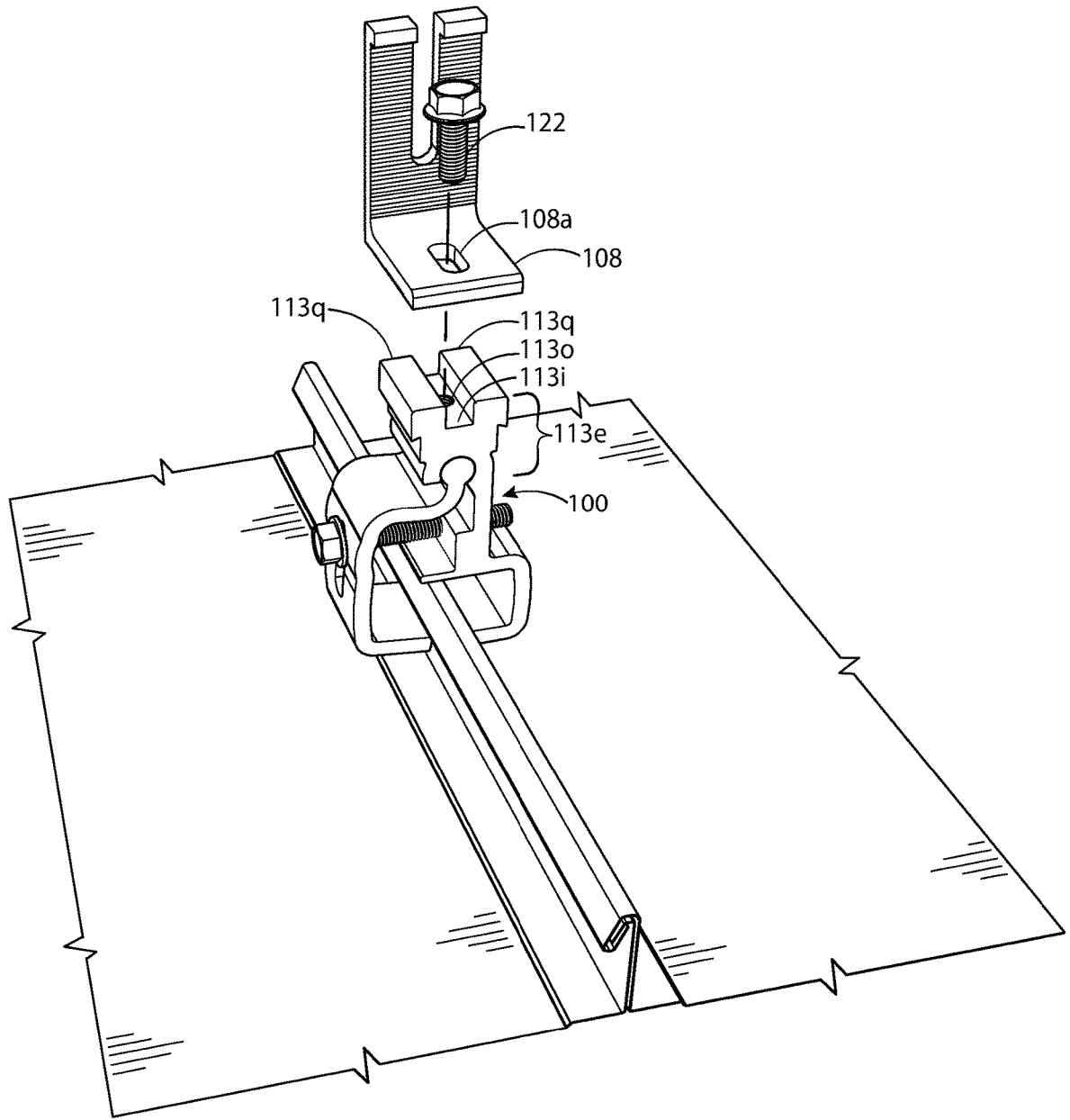
FIG. 21 illustrates, in front perspective view, the standing seam clamp and standing seam roof panel of FIG. 1 with an L-foot and threaded fastener exploded away from the standing seam clamp.

To accommodate rail-based systems, the standing seam clamp may include structure that secures an L-foot. For example, in FIGS. 1, 3, and 4, an installer might secure the standing seam clamp 100 to the rail 110 using an L-foot 108. Optionally, the installer might use an L-foot adapter 109 to secure the rail 110 to the L-foot 108. Referring to FIG. 21, the installer fastens the L-foot 108 to the standing seam clamp 100 using a threaded fastener 122 secured to an aperture 1130 in the slot 113i within clamp body top 113q of the upper clamp body 113e of the standing seam clamp 100. A portion of the threaded fastener 122 passes through an aperture 108a in the L-foot. FIG. 21 illustrates the aperture 108a as slot-shaped, which allows front-to-back adjustment of the L-foot with respect to the standing seam clamp 100.

Figure 22:
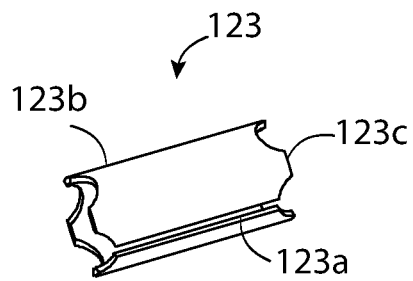
FIG. 22 illustrates an enlarged portion of FIG. 13.
Figure 23:
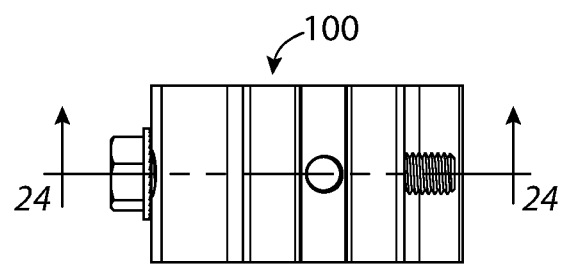
FIG. 23 illustrates a top view of the standing seam clamp.
Figure 24:
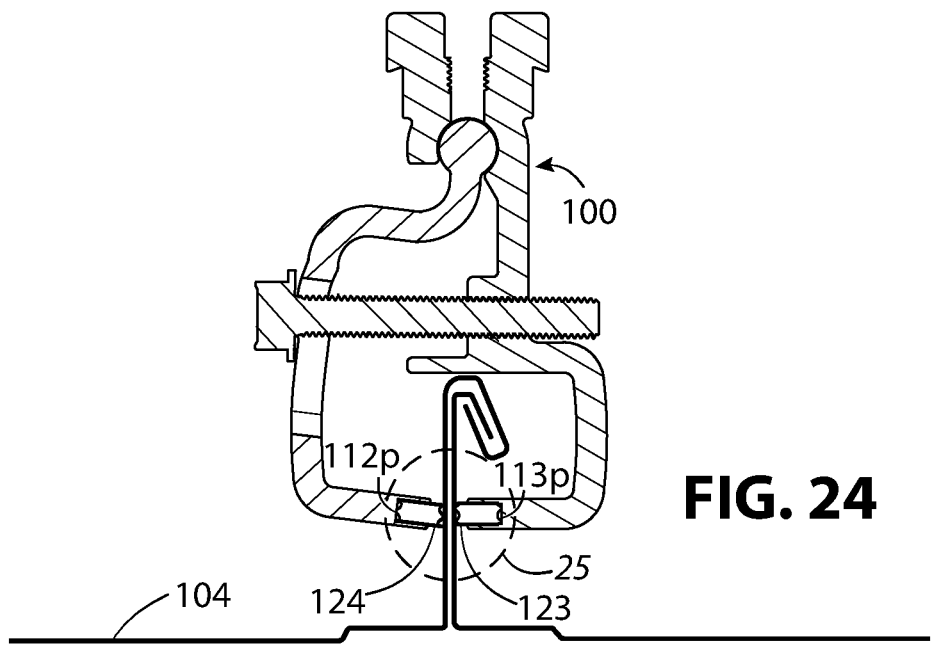
FIG. 24 illustrates a section view of FIG. 23 along section lines 24-24.
Figure 25:
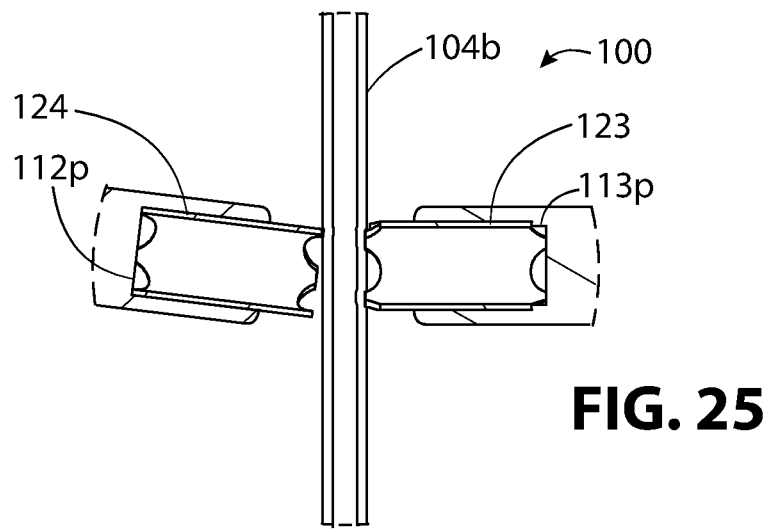
FIG. 25 illustrates an enlarged portion of FIG. 24.

To solve the system grounding issue, the inventors developed a standing seam clamp that may include some or all the elements described above but with bonding pins to facilitate electrical bonding. The bonding pins are movable within the pivot arm end and the clamp body end. The bonding pins face one another. For example, in FIGS. 13 and 14, bonding pin 123 is movable within aperture 113p (FIG. 13) in the clamp body end 113a. Bonding pin 124 is movable within aperture 112p (FIG. 14) in the pivot arm end 112a. These bonding pins optionally are slotted along their length (i.e., slotted length wise or longitudinally). FIG. 22, which is an enlarged version of the bonding pin 123 from FIG. 13, shows lengthwise slot 123a running lengthwise along the bonding pin body 123b. FIGS. 24 and 25 show the bonding pin 123 and bonding pin 124 in relationship to their apertures, aperture 113p and aperture 112p, respectively, in more detail. FIG. 24 is a section view of FIG. 23, with FIG. 23 being a top plan view of the standing seam clamp 100. FIG. 24 also shows the standing seam metal roof 104. FIG. 25 is an enlarged view of the bonding pin 123 and aperture 113p as well as bonding pin 124 and aperture 112p of FIG. 24. Referring to FIG. 25, because of the lengthwise slot 123a (see FIG. 22), the bonding pin 123 compresses when inserted into an aperture 113p that is larger than its resting diameter. Once inserted into the aperture, the pin re-expands. The bonding pin 123 is held within the aperture 113p by spring tension from the re-expansion of the bonding pin 123. As the installer tightens the standing seam clamp 100 against the standing seam 104b, the bonding pin 123 digs into the standing seam 104b and moves within the aperture 113p to dig into the standing seam clamp 100. Likewise, the same description applies for bonding pin 124 and aperture 112p. This creates an electrical bond as bonding pin 123 and bonding pin 124 break through the thin non-conductive oxide surface layer and into the conductive layer of both the standing seam clamp 100 and the standing seam 104p. The pressure from the bonding pin 123 and bonding pin 124 against the conductive layer creates a conductive electrical bond that is airtight and will resist deterioration over time from oxidation.

Referring to FIG. 5, in a rail-less system, an installer can electrically bond the solar panel 107 to the standing seam clamp 100 by using a solar panel pop-on clamp 111 that includes a bonding block 125 as well as bonding pins. For example, FIG. 5, shows bonding pin 126 seating within bonding block 125. The bonding block 125 seats within the slot 113i extending lengthwise in the upper clamp body 113e. Solar panel 107 seats against the clamp body top 113q. The bonding pins, shown here as bonding pin 126, dig into the solar panel frame 107a and standing seam clamp 100 to create an electrical bond. In FIG. 6, the solar panel frame 103a and solar panel frame 107a electrically bond to the standing seam clamp 100 by bonding pin 127 and bonding pin 126, respectively. Referring to FIG. 4, in a rail-based system, for example, the bonding block 125 and corresponding bonding pins, shown here as bonding pin 126, dig into the solar panel 107 and the rail 110 to create an electrical bond between the two components. The L-foot adapter 109 can include clamping portion 109a and clamping portion 109b that dig into the rail 110. A threaded fastener 128 with sharp components, such as a star washer, or sharp under flange, can dig into the L-foot 108 to create electrical bonding between the rail 110 and the L-foot 108. Similarly, a threaded fastener 122 or threaded fastener in combination with a washer, may electrically bond the L-foot 108 to the threaded aperture within the clamp body top.

CONCLUSION AND VARIATIONS

The Summary, Detailed Description, and figures describe devices and systems for mounting solar panels to a standing seam metal roof. This disclosure provides examples of devices, components, and configurations to help the reader understand the described general principles. The following are examples of variations and combinations of different components, structures, and features that still adhere to those general principles.

Figure 26:
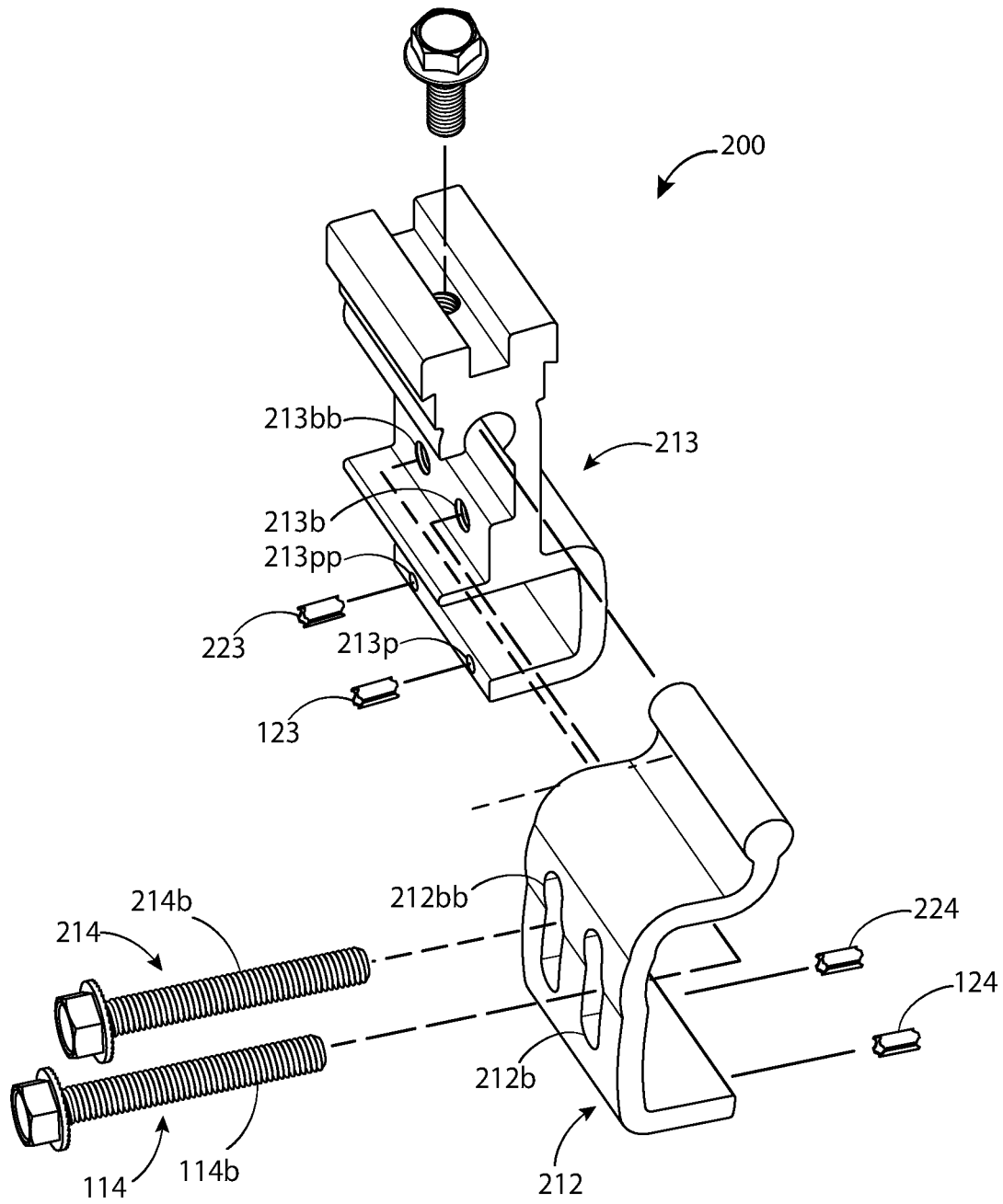
FIGS. 26 and 27 illustrate an alternative version of the standing seam clamp in exploded isometric view.
Figure 27:
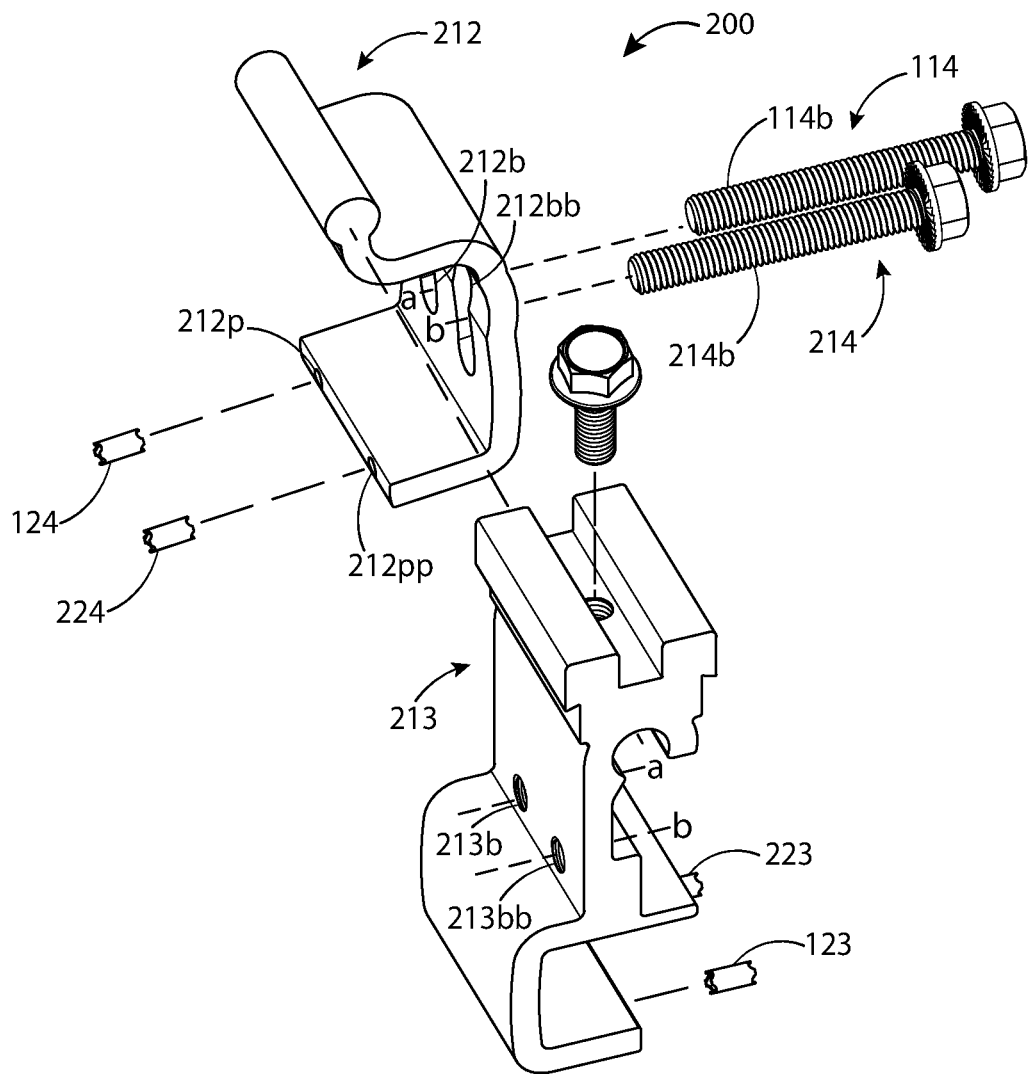
Figure 28:
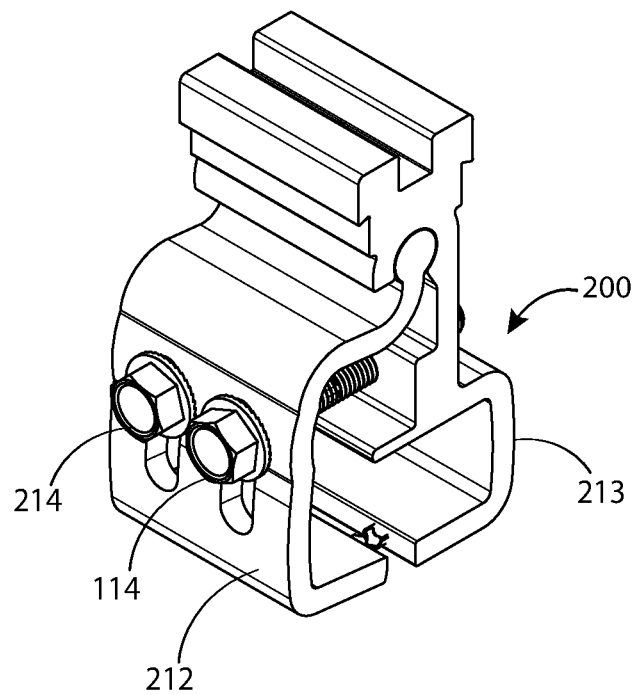
FIGS. 28-31 show, in various views, the alternative version of the standing seam clamp with the pivot arm in two different positions relative to the clamp body.
Figure 29:
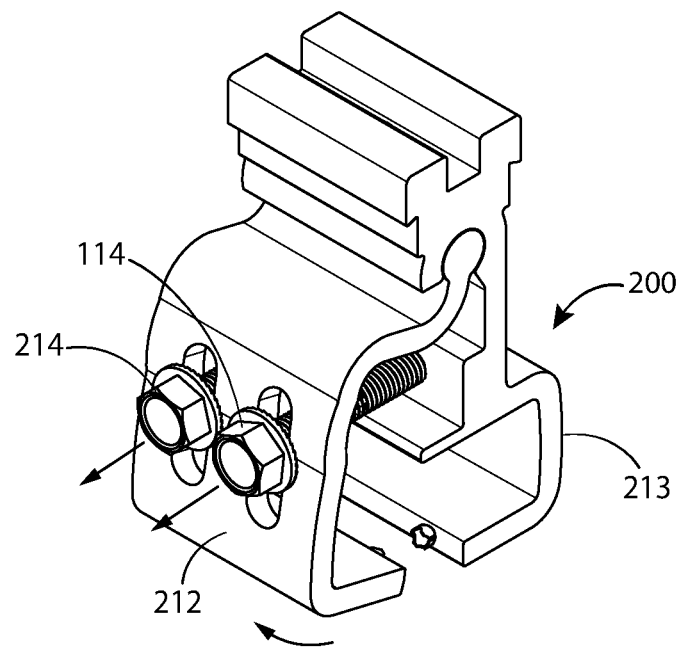
Figure 30:
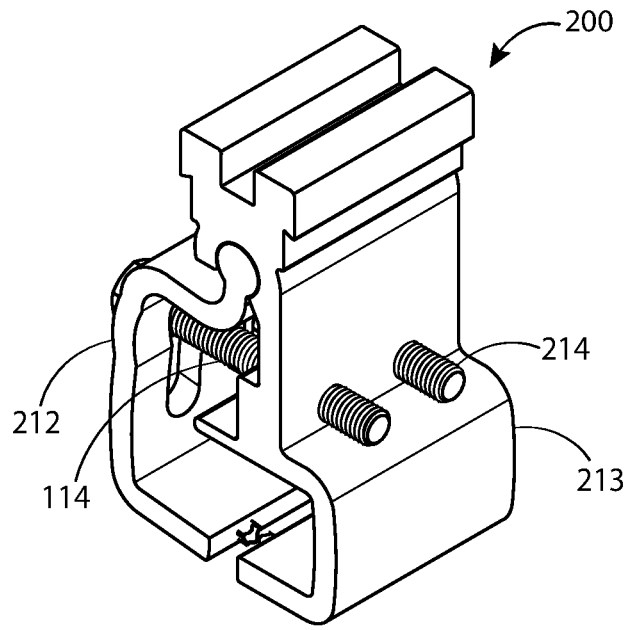
Figure 31:
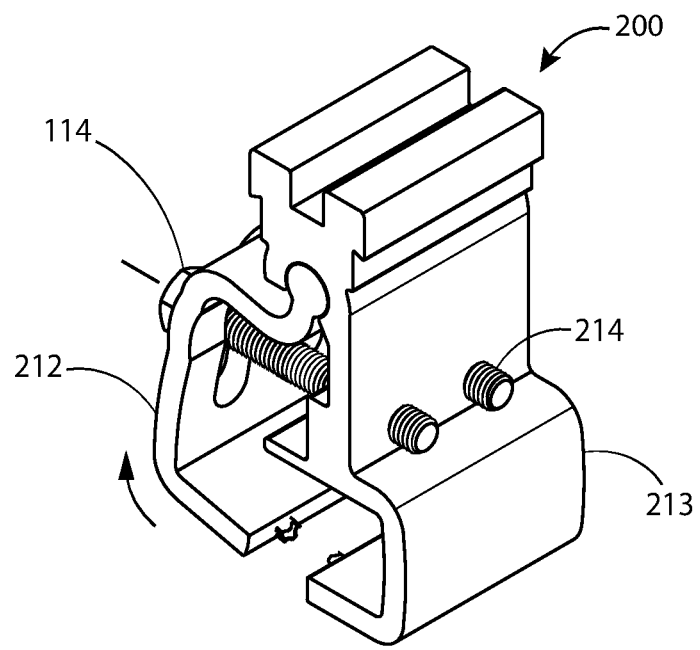

The standing seam clamp 100 of FIGS. 1-21, and 23-25 show one threaded fastener that passes through one slot-shaped aperture in the pivot arm and engages the clamp body to selectively pivot the pivot arm toward the clamp body. For example, FIG. 14 shows a portion of the fastener body 114b passing through the slot-shaped aperture 112b and into a threaded aperture 113b to selectively pivot the pivot arm 112 with respect to the clamp body 113. The standing seam clamp is not limited to one slot-shaped aperture and corresponding threaded fastener for selectively pivoting the pivot arm. To provide greater holding strength, the standing seam clamp may include two, three, or more slot-shaped apertures and corresponding threaded fasteners to selectively pivot the pivot arm with respect to the clamp body. FIGS. 26-31 illustrate a standing seam clamp 200 that includes two threaded fasteners, threaded fastener 114 and threaded fastener 214, that engage the pivot arm 212 and clamp body 213 to pivot the pivot arm 212 with respect to the clamp body 213. Referring to FIGS. 26 and 27, a portion of the fastener body 114b passes through slot-shaped aperture 212b and engages threaded aperture 213b. Similarly, fastener body 214a passes through slot-shaped aperture 212bb and engages threaded aperture 213bb. The slot-shaped aperture 212b and slot-shaped aperture 212bb may extend upward (i.e., heightwise) along the pivot arm 212. Note that in FIG. 27, for simplicity, portions of the jogged lines (i.e., the exploded trail lines showing the path of the fastener body 114b and the fastener body 214b) are omitted and replaced with designators "a" and "b." Standing seam clamp 200 is shown with four bonding pins and their corresponding apertures. FIGS. 26 and 27 show bonding pin 123 and bonding pin 223 with their corresponding apertures, the aperture 213p and aperture 213pp, respectively. FIGS. 26 and 27 show bonding pin 124 and bonding pin 224 with their corresponding apertures, the aperture 212p and aperture 212pp, respectively. Note that aperture 213p and aperture 213pp are hidden from view in FIG. 27. Aperture 212p and aperture 212pp are hidden from view in FIG. 26. These bonding pins and apertures may have a structure as previously described for the bonding pins in FIGS. 24 and 25. The remainder of the structure of the standing seam clamp may remain the same as described for the standing seam clamp 100 except the clamp body 213 and pivot arm 212 may be longer to accommodate threaded fastener 214.

This disclosure shows the threaded fasteners as hex head screws. The threaded fasteners may be any threaded fastener with suitable holding force to withstand the operating and environmental conditions of a particular solar panel system installation. For example, national, regional, or local building codes may require the solar panel system to withstand specific wind forces or other harsh environmental conditions. While the fastener heads illustrated are hex head or flanged hex head, an installer or system designer can substitute other fastener heads that might be suitable for hand tools, electric, or pneumatic tools used to install the solar panel system. Examples of such fastener heads may include socket head, truss head, or pan head. These can include various drive patterns, for example, Phillips, slot, Torx, Frearson, Clutch, square (Robertson), hex, square slot combination, fluted socket, and various types of other drive patterns known in the art and suitable for installing a solar panel system.

The standing seam clamps of this disclosure are typically aluminum. Aluminum develops an oxide layer that is not electrically conductive. As the bonding pins dig into to the standing seam clamp, they break through the non-conductive oxide layer to a conductive layer of aluminum to complete an electrical path. The standing seam clamps can be made of any electrically conductive material with sufficient strength for daily operation in an expected solar panel installations. Typical materials suitable for standing seam clamps might include steel, stainless steel, or brass, for example. If grounding is not important, the standing seam clamp may be made from a non-conductive material that can withstand the environmental conditions typical of a solar panel installation.

The standing seam clamps shown throughout this disclosure are typically extruded. This can reduce tooling and manufacturing costs. However, a manufacturer could make the standing seam clamp by other methods that will produce a standing seam clamp with an equivalent function. Examples of other ways of producing the standing seam clamp include 3D printing with metallic powders, casting, or stamping and forming.

The standing seam clamps throughout this disclosure can work with a variety of rail-based and rail-less solar panel systems. While the pop-on clamp and rail combination has many advantages, an installer may substitute other rails and other solar panel clamps that may work better for their particular installation. For example, the rail might include a slot that runs lengthwise along one of its sides. The L-foot could secure directly to this slot by a threaded fastener and keeper, such as a nut, without an L-foot adapter.

For simplicity, the solar panel system 101 of FIGS. 1, 3, and 4 and the solar panel system 102 of FIGS. 2, 5 and 6 are illustrated with two solar panels, or with one solar panel with the second solar panel removed. An actual solar panel installation would typically include more panels. For example, a solar panel installation on a standing seam roof in a residential environment may typically include one to fifty solar panels with four to two hundred or more standing seam clamps. A solar panel installation on a commercial roof could include even more solar panels and standing seams clamps. The principles discussed is scalable from small to large residential and commercial installations.

One of the advantages of the standing seam clamps of this disclosure is that they allow an installer to attach the standing seam clamp to standing seam roofs with many different standing seam roof profiles. FIGS. 15-18 showed examples of the standing seam clamp 100 attached to standing seam roofs with four different standing seam profiles. The standing seam clamp can attach to a wide variety of standing seam profiles, not just the examples above. Other non-limiting examples include T-seam (or tee), batten, trapezoidal leg, applied cap, and overlap.

FIGS. 13 and 14 shows two bonding pins for standing seam clamp 100, bonding pin 123 and bonding pin 124. FIGS. 26 and 27 show four bonding pins for standing seam clamp 200, bonding pin 123, bonding pin 124, bonding pin 223, and bonding pin 224. These examples are not limited to the illustrated number of bonding pins. Standing seam clamp 100 may use less or more bonding pins than shown. For example, no bonding pins, one bonding pin, or more than two bonding pins. Standing seam clamp 200 can use less or more bonding pins than shown, for example, no bonding pins, one bonding pin, two bonding pins, three bonding pins, or more than five bonding pins.

The variations described, the general principles taught, and undescribed variations, devices, and systems that encompass the general principles described in this disclosure are within the claim's scope.

The invention claimed is:

1. A device for securing a solar panel to a metal roof, comprising:
    a standing seam clamp including a clamp body and a pivot arm pivotally attached to the clamp body, the clamp body and the pivot arm forming outside surfaces of the standing seam clamp;
    the clamp body includes a threaded aperture extending through the clamp body and a clamp body end extending inward toward the pivot arm, the clamp body end includes a first aperture;
    the pivot arm includes a slot-shaped aperture extending upward and through the pivot arm and a pivot arm end extending inward toward the clamp body, the pivot arm end includes a second aperture;
    a threaded fastener that includes a fastener body that at least partially extends through the slot-shaped aperture and engages the threaded aperture to selectively pivot the pivot arm end with respect to the clamp body end; and
    a first bonding pin movable within the first aperture, a second bonding pin movable within the second aperture, and the first bonding pin faces the second bonding pin.

2. The device of claim 1, wherein:
    the first bonding pin and the second bonding pin are slotted along their length.

3. The device of claim 1, wherein:
the first bonding pin is held within the first aperture by spring tension and the second bonding pin is held within the second aperture by spring tension.

4. The device of claim 1, wherein:
the pivot arm further includes an upper pivot arm and hinge pin extending lengthwise along the upper pivot arm; and
the clamp body further includes an upper clamp body including a clamp body top and a hinge receiver extending lengthwise within the upper clamp body, the hinge receiver is sized and shaped to pivotally receive the hinge pin.

5. The device of claim 4, wherein:
the hinge receiver is aligned with the clamp body end in a lengthwise-heightwise plane.

6. The device of claim 5, wherein:
the clamp body includes a seam stop that extends inward from the clamp body toward the pivot arm, the seam stop is located below the threaded aperture and above the clamp body end.

7. The device of claim 6, wherein:
the seam stop includes a seam stop end, a clamp body lower portion between the seam stop end and the clamp body end is substantially c-shaped.

8. The device of claim 7, wherein:
the pivot arm further includes a c-shaped portion extending downward from the hinge pin and extending to the pivot arm end.

9. The device of claim 5, wherein:
the clamp body top includes a slot extending lengthwise along the clamp body top;
the upper clamp body includes a first upper side portion and a second upper side portion extending downward from the clamp body top; and
the first upper side portion includes a first detent located below the slot and the second upper side portion includes a second detent located below the slot.

10. The device of claim 4, wherein:
the hinge receiver includes a slot-shaped opening located at a bottom of the hinge receiver and the slot-shaped opening makes an oblique angle with respect to a lengthwise-widthwise plane.

11. The device of claim 1, wherein:
the clamp body further includes an upper clamp body with a clamp body top and a hinge receiver extending lengthwise within the upper clamp body; and
the hinge receiver is sized and shaped to pivotally receive the pivot arm and includes a slot-shaped opening located at a bottom of the hinge receiver and the slot-shaped opening makes an oblique angle with respect to a lengthwise-widthwise plane.

12. A device for securing a solar panel to a metal roof, comprising:
a standing seam clamp including a clamp body and a pivot arm, the clamp body and the pivot arm forming outside surfaces of the standing seam clamp;
the pivot arm includes an upper pivot arm, a hinge pin extending lengthwise along the upper pivot arm, a slot-shaped aperture extending upward and through the pivot arm, and a pivot arm end extending inward toward the clamp body;
the clamp body includes a threaded aperture extending through the clamp body, a clamp body end extending inward toward the pivot arm, an upper clamp body including a clamp body top and a hinge receiver extending lengthwise within the upper clamp body, the hinge receiver is sized and shaped to pivotally receive and captively hold the hinge pin;
the clamp body top includes a slot extending lengthwise along the clamp body top;
the upper clamp body includes a first upper side portion and a second upper side portion extending downward from the clamp body top;
the first upper side portion includes a first detent located below the slot and the second upper side portion includes a second detent located below the slot;
the clamp body includes a seam stop that extends inward from the clamp body toward the pivot arm, the seam stop is located below the threaded aperture and above the clamp body end; and
a threaded fastener that includes a fastener body that at least partially extends through the slot-shaped aperture and engages the threaded aperture to selectively pivot the pivot arm end with respect to the clamp body end.

13. The device of claim 12, wherein:
the pivot arm further includes a c-shaped portion extending downward from the hinge pin and extending to the pivot arm end; and
the seam stop includes a seam stop end, a clamp body lower portion between the seam stop end and the clamp body end is substantially c-shaped.

14. The device of claim 12, wherein:
the hinge receiver includes a slot-shaped opening located at a bottom of the hinge receiver and the slot-shaped opening makes an oblique angle with respect to a lengthwise-widthwise plane.

15. The device of claim 14, wherein the hinge receiver is aligned with the clamp body end in a lengthwise-heightwise plane.

16. The device of claim 13, wherein the hinge receiver is aligned with the clamp body end in a lengthwise-heightwise plane.

17. The device of claim 12, wherein the hinge receiver is aligned with the clamp body end in a lengthwise-heightwise plane.

* * * * *